US011637701B2

(12) United States Patent
Sekar et al.

(10) Patent No.: US 11,637,701 B2
(45) Date of Patent: Apr. 25, 2023

(54) TECHNOLOGIES FOR CONDUCTING A DATA TRANSACTION BETWEEN ENTERPRISES USING A PERMISSIONED BLOCKCHAIN INFRASTRUCTURE AND AN ORACLE SYSTEM

(71) Applicant: Genesys Cloud Services, Inc., Menlo Park, CA (US)

(72) Inventors: Archana Sekar, Chennai (IN); Javier Villalobos, Daly City, CA (US); Yochai Konig, San Francisco, CA (US)

(73) Assignee: Genesys Cloud Services, Inc., Menlo Park, CA (US)

( * ) Notice: Subject to any disclaimer, the term of this patent is extended or adjusted under 35 U.S.C. 154(b) by 317 days.

(21) Appl. No.: 17/029,834

(22) Filed: Sep. 23, 2020

(65) Prior Publication Data
US 2022/0094543 A1    Mar. 24, 2022

(51) Int. Cl.
G06F 16/27    (2019.01)
H04L 9/32    (2006.01)
G06Q 30/018    (2023.01)

(52) U.S. Cl.
CPC .......... H04L 9/32 (2013.01); G06F 16/27 (2019.01); G06Q 30/0185 (2013.01)

(58) Field of Classification Search
CPC ...... G06Q 30/0185; G06Q 10/10; H04L 9/32; H04L 51/02; H04L 9/3239; H04L 9/3297; H04L 9/50; G06F 16/27
See application file for complete search history.

(56) References Cited

U.S. PATENT DOCUMENTS

2018/0276269 A1*   9/2018 Rasscevskis .......... G06F 16/273
2018/0331835 A1*  11/2018 Jackson ............. G06Q 20/3829
2020/0065803 A1*   2/2020 Abouelenin ........... G06Q 20/36
(Continued)

OTHER PUBLICATIONS

Dragonchain; What Different Types of Blockchains are There?; Blockchain; Apr. 18, 2019; 9 pages.
(Continued)

*Primary Examiner* — Cam Y T Truong
(74) *Attorney, Agent, or Firm* — Taft Stettinius & Hollister LLP

(57) ABSTRACT

A method for conducting a data transaction between an on-chain enterprise and an off-chain enterprise according to one embodiment includes receiving at the on-chain enterprise a request for data from an end user; determining that the off-chain enterprise possesses the requested data; transmitting the request for data to an oracle system; transmitting the request for data to the off-chain enterprise; providing the requested data to the oracle system; providing the requested data to the on-chain enterprise by (i) generating a block representing the data transaction in the blockchain infrastructure, (ii) publishing the block to one or more nodes in the blockchain infrastructure, (iii) validating the data transaction at the one or more nodes in the blockchain infrastructure, (iv) adding the block to a blockchain based on a consensus reached among the one or more nodes in the blockchain infrastructure, (v) updating the one or more nodes in the blockchain infrastructure with the block, and (vi) labeling the data transaction as successful; and transmitting the requested data to the end user.

17 Claims, 12 Drawing Sheets

(56) References Cited

U.S. PATENT DOCUMENTS

| | | | |
|---|---|---|---|
| 2020/0175526 A1* | 6/2020 | Yang | G06F 16/2379 |
| 2020/0293514 A1* | 9/2020 | Rudek | G06F 21/6245 |
| 2021/0074120 A1* | 3/2021 | Ragnoni | G07F 17/329 |
| 2021/0342823 A1* | 11/2021 | Benkreira | G06F 9/44526 |
| 2021/0357387 A1* | 11/2021 | Lee | H04L 9/3239 |
| 2021/0367762 A1* | 11/2021 | Bae | G06F 21/64 |
| 2022/0239508 A1* | 7/2022 | Liu | H04L 9/50 |
| 2022/0271924 A1* | 8/2022 | Shao | H04L 9/0825 |

OTHER PUBLICATIONS

Anastasiia Lastovetska; Blockchain Architecture Basics: Components, Structure, Benefits & Creation; MLSDev; 23 pages.

Kiran Vaidya; The Byzantine Generals' Problem; All Things Ledger; 6 pages.

Blockchain 101; What is Blockchain Technology?; Mar. 9, 2017; 38 pages.

Jennifer Sanati; Top 10 Reasons to Setup a Client-Server Network; IT Peer Network; May 2, 2011; 9 pages.

Morgen E. Peck; Blockchains: How They Work and Why They'll Change the World; IEEE Spectrum; Sep. 28, 2017; 11 pages.

Dr. Gideon Greenspan; Why Many Smart Contract Use Cases Are Simply Impossible; CoinDesk: Markets; Apr. 17, 2016; 6 pages.

Satoshi Nakamoto; Bitcoin: A Peer-to-Peer Electronic Cash System; www.bitcoin.org; 9 pages.

Decentralized Oracles (Mainnet); 4 pages.

Steve Ellis et al.; ChainLink—A Decentralized Oracle Network; Sep. 4, 2017; 38 pages; v1.0.

Thomas Bertani; Oraclize, The Provably-Honest Oracle Service, is Finally Here!; Provable Things; Nov. 4, 2015; 3 pages.

Thomas Bertani; Understanding Oracles; Provable Things; Feb. 18, 2016; 6 pages.

Davide Calvaresi et al.; A Goal-Oriented Requirements Engineering Approach for the Ambient Assisted Living Domain; May 2014; 5 pages.

Alevtina Dubovitskaya et al.; A Multiagent System for Dynamic Data Aggregation in Medical Research; Hindawi Publishing Corporation; BioMed Research International; 2016; 13 pages.

Davide Calvaresi et al.; Exploring the Ambient Assisted Living Domain: A Systematic Review; CrossMark; J Ambient Intell Human Comput; May 4, 2016; 19 pages.

Davide Calvaresi et al.; Agent-Based Systems for Telerehabilitation: Strengths, Limitations and Future Challenges; Conference Paper; May 2017; 23 pages.

Karla Kvaternik et al.; Privacy-Preserving Platform for Transactive Energy Systems; Jan. 30, 2018; 6 pages.

Karima Qayumi et al.; Multi-Agent Based Intelligence Generation from Very Large Datasets; 2015 IEEE International Conference on Cloud Engineering; 3 pages.

Alex Norta et al.; Conflict-Resolution Lifecycles for Governed Decentralized Autonomous Organization Collaboration; EGOSE '15; Nov. 24-25, 2015; 14 pages.

S. Ponomarev et al.; Multi-Agent Systems and Decentralized Artificial Superintellegence; Moscow Power Engineering Institute; Moscow Institute of Physics and Technology; 18 pages.

Oliver Belin; The Difference Between Blockchain & Distributed Ledger Technology; Tradeix; Retrieved on: Sep. 23, 2020; 5 pages.

\* cited by examiner

TECHNOLOGIES FOR CONDUCTING A DATA TRANSACTION BETWEEN ENTERPRISES USING A PERMISSIONED BLOCKCHAIN INFRASTRUCTURE AND AN ORACLE SYSTEM

BACKGROUND

When an end user requests data from an enterprise, the enterprise may rely on its own collected data stored in a centralized data repository to respond to such a request. Additionally, when an end user requests data from an enterprise that does not possess such data, the enterprise may desire to help the end user by obtaining the data from another enterprise. The ability of enterprises to share data may be very convenient for an end user since an end user would enjoy seamless service between enterprises for any need. For example, if an end user needs to update or change a physical address with several enterprises, such an action may require much more effort to individually contact each enterprise to update or change the physical address. It would be very convenient for the end user if the end user could update such details with one enterprise such that the update would occur at other enterprises. There is a strong need to address these technical system challenges.

When an enterprise needs to obtain data stored by another enterprise, the enterprises may often utilize a trusted third party intermediary to facilitate communications. There are various disadvantages with using a trusted third party intermediary, however, including the extra costs required to use a trusted third party intermediary, that the enterprises must trust the third party intermediary to not abuse its power and to faithfully provide its services, that there is a risk that another third party may gain control over the trusted third party intermediary thereby enabling the other third party to compromise the trusted third party intermediary's services, and that customers do not receive a single experience across multiple enterprises. Additionally, when the end user needs to use the same data that is generated by one enterprise at another enterprise, storage in a centralized data repository does not allow data sharing. For example, if an end user provides travel, food, and lodging information to a first enterprise, the end user would have no way to use the same information with a second enterprise. Such a problem generates a substantial amount of repetitive actions for the end user for each duplicative data request across multiple enterprises.

SUMMARY

According to an embodiment, a method for conducting a data transaction between an on-chain enterprise internal to a blockchain network and an off-chain enterprise external to the blockchain network using a permissioned blockchain infrastructure and an oracle system may include receiving at the on-chain enterprise a request for data from an end user; determining that the off-chain enterprise possesses the requested data; transmitting, by the on-chain enterprise, the request for data to the oracle system; transmitting, by the oracle system, the request for data to the off-chain enterprise; providing, by the off-chain enterprise, the requested data to the oracle system; providing the requested data to the on-chain enterprise by (i) generating a block representing the data transaction in the blockchain infrastructure, (ii) publishing the block to one or more nodes in the blockchain infrastructure, (iii) validating the data transaction at the one or more nodes in the blockchain infrastructure, (iv) adding the block to a blockchain based on a consensus reached among the one or more nodes in the blockchain infrastructure, (v) updating the one or more nodes in the blockchain infrastructure with the block, and (vi) labeling the data transaction as successful; and transmitting the requested data to the end user.

In some embodiments, providing the requested data to the on-chain enterprise may include using the oracle system as a bridge between the on-chain enterprise and the off-chain enterprise.

In some embodiments, the oracle system may include an automated oracle.

In some embodiments, the oracle system may include at least one of a single sourced oracle and a multiple sourced oracle.

In some embodiments, the method may further include a technical framework to reduce the risk of the oracle system tampering with the requested data.

In some embodiments, the technical framework may include at least one of a digital notary, a secure hardware bridge, and an additional oracle system.

In some embodiments, the block includes self-executing computer-executable code configured to monitor one or more conditions associated with the blockchain.

In some embodiments, one or more non-transitory machine-readable storage media may include a plurality of instructions stored thereon that, in response to execution by at least one processor, causes the at least one processor to execute a method of the present disclosure.

In some embodiments, a method for automatically completing data transactions using a permissioned blockchain infrastructure may include receiving at a first enterprise a request for first data from an end user; providing, by the first enterprise, the requested first data to the end user thereby completing a first data transaction; storing the first data transaction on a blockchain by (i) generating a block representing the first data transaction in the blockchain infrastructure, (ii) publishing the block to one or more nodes in the blockchain infrastructure, (iii) validating the first data transaction at the one or more nodes in the blockchain infrastructure, (iv) adding the block to the blockchain based on a consensus reached among the one or more nodes in the blockchain infrastructure, (v) updating the one or more nodes in the blockchain infrastructure with the block, and (vi) labeling the first data transaction as successful; determining that an event associated with the first data transaction occurred at a second enterprise by using a mining server to retrieve the first data transaction in response to identifying the event; and completing, by the second enterprise, a second data transaction.

In some embodiments, the method may further include storing the second data transaction on the blockchain by (i) generating a second block representing the second data transaction in the blockchain infrastructure, (ii) publishing the second block to the one or more nodes in the blockchain infrastructure, (iii) validating the second data transaction at the one or more nodes in the blockchain infrastructure, (iv) adding the second block to the blockchain based on a second consensus reached among the one or more nodes in the blockchain infrastructure, (v) updating the one or more nodes in the blockchain infrastructure with the second block, and (vi) labeling the second data transaction as successful.

In some embodiments, the second enterprise communicates with a personal bot system to complete the second data transaction.

In some embodiments, the second enterprise communicates with an oracle system to complete the second data transaction.

In some embodiments, the block includes self-executing computer-executable code configured to monitor one or more conditions associated with the blockchain.

In some embodiments, a system for conducting a data transaction between an on-chain enterprise internal to a blockchain network and an off-chain enterprise external to the blockchain network using a permissioned blockchain infrastructure and an oracle system may include at least one processor; and at least one memory comprising a plurality of instructions stored thereon that, in response to execution by the at least one processor, causes the system to receive at the on-chain enterprise a request for data from an end user; determine that the off-chain enterprise possesses the requested data; transmit, by the on-chain enterprise, the request for data to the oracle system; transmit, by the oracle system, the request for data to the off-chain enterprise; provide, by the off-chain enterprise, the requested data to the oracle system; provide the requested data to the on-chain enterprise by (i) generating a block representing the data transaction in the blockchain infrastructure, (ii) publishing the block to one or more nodes in the blockchain infrastructure, (iii) validating the data transaction at the one or more nodes in the blockchain infrastructure, (iv) adding the block to a blockchain based on a consensus reached among the one or more nodes in the blockchain infrastructure, (v) updating the one or more nodes in the blockchain infrastructure with the block, and (vi) labeling the data transaction as successful; and transmit the requested data to the end user.

In some embodiments, providing the requested data to the on-chain enterprise may include using the oracle system as a bridge between the on-chain enterprise and the off-chain enterprise.

In some embodiments, the oracle system may include an automated oracle.

In some embodiments, the oracle system may include at least one of a single sourced oracle and a multiple sourced oracle.

In some embodiments, the method may further include a technical framework to reduce the risk of the oracle system tampering with the requested data.

In some embodiments, the technical framework may include at least one of a digital notary, a secure hardware bridge, and an additional oracle system.

In some embodiments, the block includes self-executing computer-executable code configured to monitor one or more conditions associated with the blockchain.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
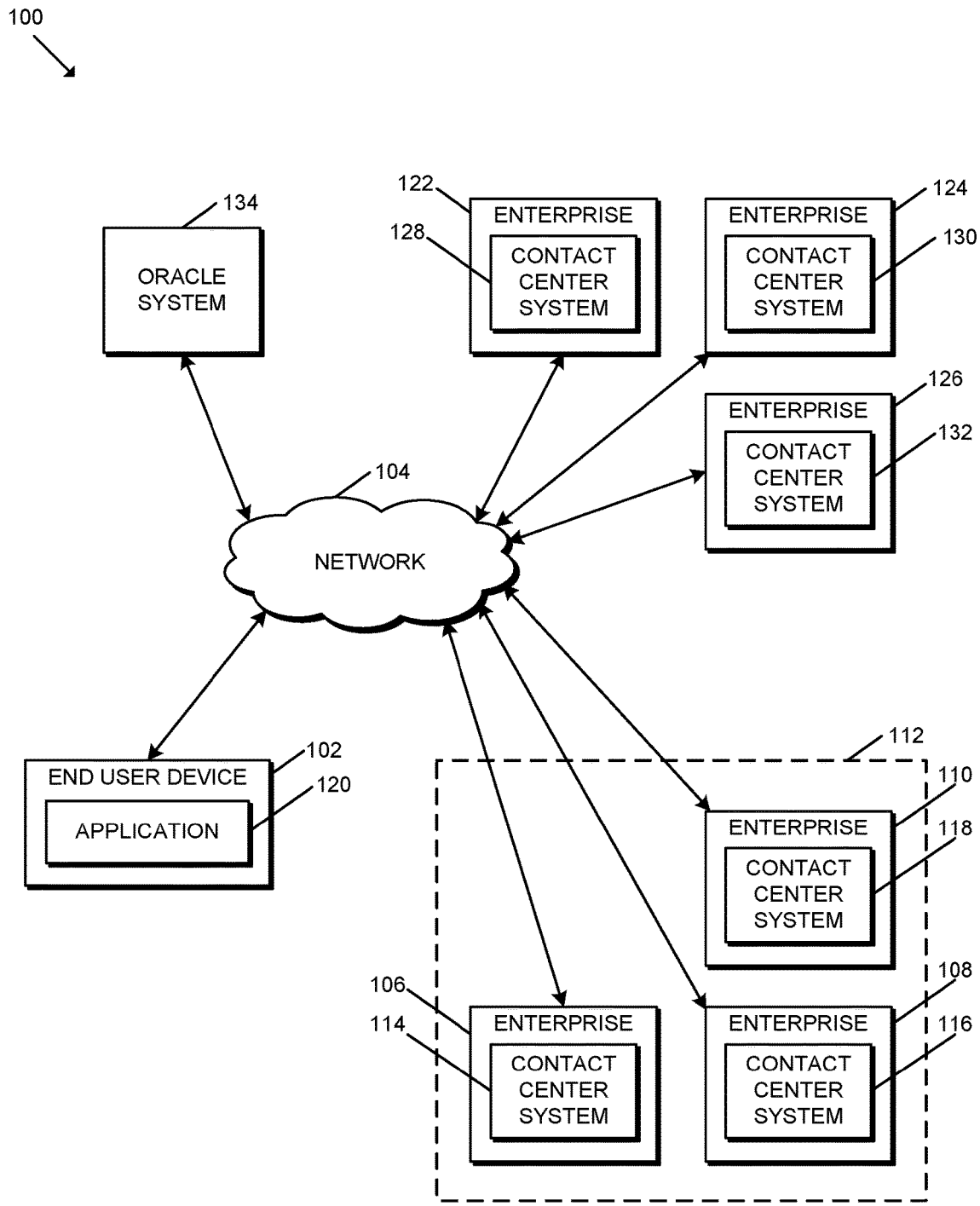
FIG. 1 is a simplified block diagram of at least one embodiment of a system for conducting a data transaction between enterprises using a permissioned blockchain infrastructure.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for conducting a data transaction between enterprises using a permissioned blockchain infrastructure includes an end user device 102, a network 104, an enterprise 106, an enterprise 108, an enterprise 110, an enterprise 122, an enterprise 124, an enterprise 126, and an oracle system 134. Additionally, in the illustrative embodiment, each of the enterprises 106, 108, 110 is included in or otherwise associated with an enterprise system 112. In some embodiments, each of the enterprises 106, 108, 110 is included in or otherwise associated with an enterprise system 112 such that each of the enterprises 106, 108, 110 may be an "on-chain" enterprise. An on-chain enterprise may be an enterprise that is within the blockchain network described in the present disclosure. In some embodiments, each of enterprises 122, 124, 126 may be "off-chain" enterprises. An off-chain enterprise may be an enterprise that is not within the blockchain network described in the present disclosure. Further, in the illustrative embodiment, the enterprise 106 includes a contact center system 114, the enterprise 108 includes a contact center system 116, the enterprise 110 includes a contact center system 118, the enterprise 122 includes a contact center system 128, the enterprise 124 includes a contact center system 130, and the enterprise 126 includes a contact center system 132. It should be appreciated that references to the enterprise 106 or the enterprise 122 herein may be made for clarity of the description and may be intended to be for illustrative purposes only. Accordingly, in some embodiments, such references to the enterprise 106 may be alternatively made with respect to the enterprise 108 or the enterprise 110 without loss of generality. Similarly, in some embodiments, such references to the enterprise 122 may be alternatively made with respect to the enterprise 124 or the enterprise 126 without loss of generality.

Although only one end user device 102, one network 104, one enterprise system 112, and one oracle system 134 are shown in the illustrative embodiment of FIG. 1, the system 100 may include multiple end user devices 102, networks 104, enterprise systems 112, and/or oracle systems 134 in other embodiments. For example, in some embodiments, multiple end user devices 102 may be used to access a web-based graphical user interface that permits end users to request data from enterprises 106, 108, 110, 122, 124, 126. Similarly, in some embodiments, the system 100 may include multiple other enterprises 106, 108, 110, 122, 124, 126 and multiple other contact center systems 114, 116, 118, 128, 130, 132. Additionally, it should be appreciated that the enterprise system 112 includes three enterprises 106, 108, 110 by way of example only, and in some embodiments, the enterprise system 112 may include a different number of enterprises. Further, in some embodiments, the contact center systems 114, 116, 118, 126, 128, 130 may be excluded from one or more of the corresponding enterprises 106, 108, 110, 122, 124, 128. For example, in some embodiments, one or more of the enterprises 106, 108, 110, 122, 124, 128 may not be associated with a contact center and, therefore, not include a contact center system.

The system 100 and technologies described herein may permit user data transfer among different enterprises (e.g., the enterprises 106, 108, 110) within an enterprise system (e.g., the enterprise system 112), which may reduce the risks and problems associated with centralized storage systems. The enterprise system 112 includes the enterprises 106, 108, 110 that may be vetted prior to being included in the enterprise system 112, which may allow the enterprises 106, 108, 110 within the enterprise system 112 to receive interoperability benefits. The permissioned blockchain infrastructure and blockchain network technologies described herein may eliminate the need for third party intermediaries to operate in between enterprises when an enterprise needs to obtain data stored by another enterprise, which also eliminates the risks associated with a third party intermediary (e.g., abuse of power, another third party gaining control over the third party intermediary, etc.). Because various consensus protocols are needed to validate a data transaction, the permissioned blockchain infrastructure and blockchain network may remove the risk of duplicate entry and/or fraud. Each data transaction occurring in the permissioned blockchain infrastructure and blockchain network may be transparent such that the enterprises 106, 108, 110 within the enterprise system 112 may view each data transaction. Therefore, the permissioned blockchain infrastructure and blockchain network technologies described herein may provide a structured, authenticated, confidential, and secured platform to use data concerning a particular end user that other enterprises possess.

Additionally, the blockchain associated with the technologies of the present disclosure may be a valuable dataset to know more about end users as well as provide personalized end user service to the end users (e.g., for contact center operations). With more data being shared about end users, the insights drawn from such data may benefit both the user/customer and the enterprise receiving the request from the end user. Further, the enterprises and the technological platform may use this data to obtain more valuable insights that may improve productivity of such enterprises. Therefore, personalization, predictive and prescriptive analysis, and automation may be unified across enterprises in an enterprise system using the permissioned blockchain infrastructure and blockchain network technologies described herein.

It should be appreciated that each of the end user device 102, network 104, enterprises 106, 108, 110, 122, 124, 126, enterprise system 112, contact center systems 114, 116, 118, 128, 130, 132, and oracle system 134 may be embodied as any type of device/system or collection of devices/systems suitable for performing the functions described herein. More specifically, in the illustrative embodiment, the end user device 102 may be a voice communications device, such as a telephone, a cellular phone, or a satellite phone. The end user device 102 alternatively may be, for example, an electronic tablet, an electronic book reader, a personal digital assistant (PDA), a portable music player, or a computer capable of communication with the enterprise 106. The end user device 102 may have various input/output devices with which a user may interact to provide and receive audio, text, video, and/or other forms of data. The end user device 102 may allow an end user to interact with the enterprise 106 (and/or other devices of the system 100) over the network 104 as described herein.

In some embodiments, the end user device 102 may be embodied as any type of device capable of executing an application and otherwise performing the functions described herein. For example, in the illustrative embodiment, the end user device 102 may be configured to execute an application 120. It should be appreciated that the application 120 may be embodied as any type of application suitable for performing the functions described herein. In particular, in some embodiments, the application 120 may be embodied as a mobile application (e.g., a smartphone application), a cloud-based application, a web application, a thin-client application, and/or another type of application. For example, in some embodiments, the application 120 may serve as a client-side interface (e.g., via a web browser) for a web-based application or service. Additionally, although only one application 120 is shown as being executed by the end user device 102, it should be appreciated that end user device 102 may be configured to execute other applications in order to perform the functions described herein.

In some embodiments, the application 120 may be an automated agent (i.e., a personal bot system) configured to automate interactions with enterprises (e.g., the enterprise 106) and/or other devices/services to achieve particular goals or results as requested by end users (e.g., a request for data) via the end user device 102. The personal bot system may be physically located in, and performed by, the end user device 102 whereas other aspects of the end user-side system may be physically located in, and executed by, a cloud computing service (e.g., the cloud computing service 230 of FIG. 2). As one example, an end user may have an issue with her cable internet service and communicate this issue to her personal bot system by speaking or typing a natural language phrase such as: "My internet connection is down. Please contact the cable company for service." A natural language refers to a language used by humans to communicate with one another (e.g., English, Spanish, French, Chinese, etc.), which is in contrast to artificial or constructed languages such as computer programming languages (e.g., C, Python, JavaScript, assembly language, etc.). The personal bot system interacts with the appropriate enterprise (e.g., the enterprise 106, which in this case, is the cable internet provider) on behalf of the end user to accomplish the end user's request (i.e., to fix the problem). During the interaction, the personal bot system may prompt the end user for additional information requested by the enterprise (e.g., a selection from a set of proposed appointment times for a technician to visit) if the personal bot system does not have access to the information, or the personal bot system may automatically respond to the question based on access to user information (e.g., appointment times may be selected through a detection of available times in the end user's calendar and preferred times specified by the end user, either as part of the request, or as part of a standing general preference).

As another example involving booking flights, when requesting information about the status of current flight reservations, an enterprise (e.g., the enterprise 106) may respond directly to the personal bot system with a list of all flights booked by the end user and associated details. However, in some embodiments, the enterprise (e.g., the enterprise 106) may request additional information based on the information in the initial request. For example, when booking a flight, the airline may respond with a list of flights available from LAX to SFO on May 19 and a list of flights available from SFO to LAX on May 24, along with flight information such as departure times, arrival times, and prices. The personal bot system may then respond to this request for more information with the selection of a particular pair of flights. Similarly, after selecting flights, the enterprise (e.g., the enterprise 106) may request the choice from among a list of available seats. Accordingly, some embodiments of the present disclosure relate to automating back-and-forth interactions between an enterprise (e.g., the enterprise 106) and a personal bot system. In some embodiments, automatic back-and-forth interactions between a personal bot system and an enterprise (e.g., the enterprise 106) allows the personal bot system to negotiate transactions with the enterprise on behalf of the end user with reduced or no involvement from the end user. In some embodiments, the personal bot system may interact with an enterprise (e.g., the enterprise 106) through various interfaces provided by the enterprise, such as APIs published by the enterprise (e.g., provided by web servers 222 of the contact center system 200 of FIG. 2) and chat bots associated with the enterprise.

The network 104 may be embodied as any one or more types of communication networks that are capable of facilitating communication between the various devices communicatively connected via the network 104. As such, the network 104 may include one or more networks, routers, switches, access points, hubs, computers, and/or other intervening network devices. For example, the network 104 may be embodied as or otherwise include one or more cellular networks, telephone networks, local or wide area networks, publicly available global networks (e.g., the Internet), ad hoc networks, short-range communication links, or a combination thereof. In some embodiments, the network 104 may include a circuit-switched voice or data network, a packet-switched voice or data network, and/or any other network able to carry voice and/or data. In particular, in some embodiments, the network 104 may include Internet Protocol (IP)-based and/or asynchronous transfer mode (ATM)-based networks. In some embodiments, the network 104 may handle voice traffic (e.g., via a Voice over IP (VOIP) network), web traffic (e.g., such as hypertext transfer protocol (HTTP) traffic and hypertext markup language (HTML) traffic), and/or other network traffic depending on the particular embodiment and/or devices of the system 100 in communication with one another. In various embodiments, the network 104 may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. The network 104 may enable connections between the various devices/systems 102, 106, 108 of the system 100. It should be appreciated that the various devices/systems 102, 106, 108 may communicate with one another via different networks 104 depending on the source and/or destination devices 102, 106, 108.

The enterprises 106, 108, 110, 122, 124, 126 may be embodied as any one or more types of devices/systems that are capable of interacting with an end user and otherwise performing the functions described herein. It should be appreciated that the enterprises 106, 108, 110, 122, 124, 126 may be associated with organizations (e.g., companies) in some embodiments. The enterprises 106, 108, 110 may possess certain data and provide such data to an end user in response to a request from the end user. For example, an end user may desire to purchase airline tickets from an airline enterprise. End users may purchase plane tickets by calling an airline enterprise (e.g., the enterprise 106) to speak with a sales agent (e.g., a sales agent associated with the contact center system 114) and providing payment information over the telephone. End users may alternatively use the airline's website to search for flights and enter payment through a form in the web browser. In the illustrative embodiment, end users may interact with the contact center system 114 of enterprise 106 over the network 104 via the end user device 102.

The enterprise system 112 may be embodied as any one or more types of devices/systems that are capable of functioning as a unit and interacting via a technological platform to exchange data and other resources and otherwise performing the functions described herein. For example, in the illustrative embodiment, the enterprise system 112 may include the enterprises 106, 108, 110 and such enterprises may share data and other resources with each other. The enterprise system 112 may include other enterprises that are not shown in FIG. 1 or fewer enterprises than those shown in FIG. 1 depending on the particular embodiment. The enterprise 106 may exchange data over the network 104 with one or more of the enterprises 108, 110 in the enterprise system 112. It should be appreciated that the enterprise system 112 may be a private system, for example, in which any enterprises not included in the enterprise system 112 cannot access the technological platform without either being added to the enterprise system 112 or being given permission to access the technological platform via the enterprise system 112.

It should be further appreciated that the enterprises included in the enterprise system 112 may or may not be associated with related legal entities (e.g., subsidiary companies, daughter companies, other companies that are owned or controlled by another company such as a parent company, etc.) depending on the particular embodiment. Further, although the enterprises of the enterprise system 112 are described herein as being associated with one another (e.g., as nodes in a private system associated with a permissioned blockchain infrastructure), in other embodiments, it should be appreciated that the enterprises may be associated with one another only insofar as they are configured to communicate with the end user device 102 and/or other devices of the system 100 and otherwise perform the functions described herein.

The oracle system 134 may be embodied as any one or more types of devices/systems that are capable of connecting the blockchain network described in the present disclosure to data sources and/or resources that are "external" to the blockchain network of the present disclosure and/or otherwise performing the functions described herein. For example, in some embodiments, the oracle system 134 may connect the blockchain network (e.g., one or more of the enterprises 106, 108, 110 of the enterprise system 112) with an off-chain enterprise (e.g., one or more of the enterprises 122, 124, 126). The oracle system 134 may function as a bridge between the blockchain network and the off-chain enterprises. For example, the oracle system 134 may permit the blockchain network to receive data and/or requests from off-chain enterprises. Similarly, the oracle system 134 may permit the off-chain enterprises to receive data and/or requests from the blockchain network. APIs may be used to transmit data and/or requests to the blockchain network.

The oracle system 134 may be embodied as or include one or more automated oracles and/or one or more human oracles. In some embodiments, the one or more automated oracles may receive a data request from the blockchain network (e.g., via the enterprise 106). In response to receiving the data request, the one or more automated oracles may automatically access a data source of an off-chain enterprise (e.g., the enterprise 122). In some embodiments, the data source may be one or more off-chain enterprises (e.g., the enterprise 122), one or more off-chain databases, one or more off-chain data structures, one or more off-chain web-based APIs, and/or one or more off-chain data storage devices/systems capable of storing data or otherwise facilitating the storage of such data. The one or more automated oracles may then retrieve the requested data (e.g., from the enterprise 122) and may automatically transmit the requested data to the blockchain network (e.g., to the enterprise 106). In some embodiments, the one or more automated oracles may be communicating with one or more smart contracts of the blockchain network to perform the functions disclosed herein. The data source from which the data may be retrieved may be predetermined by one or more smart contracts of the blockchain network. Additionally or alternatively, in some embodiments, the one or more automated oracles may receive a data request from an off-chain enterprise (e.g., the enterprise 122). In response to receiving the data request, the one or more automated oracles may automatically access the requested data from the blockchain network (e.g., via the enterprise 106). The one or more automated oracles may then automatically transmit the requested data to the off-chain enterprise (e.g., to the enterprise 122).

It should be appreciated that the one or more automated oracles of the oracle system 134 may include one or more inbound automated oracles and/or one or more outbound automated oracles. For example, in some embodiments, the one or more outbound automated oracles may receive the request for data from the blockchain network (e.g., via the enterprise 106) and transmit the request for data to the data source of an off-chain enterprise (e.g., via the enterprise 122). The one or more inbound automated oracles may receive the requested data from the off-chain enterprise (e.g., via the enterprise 122) and transmit the requested data to the blockchain network (e.g., via the enterprise 106).

The one or more human oracles may include or be otherwise associated with human involvement. In some embodiments, a human oracle may be able to not only transmit deterministic data but may also respond to arbitrary requests that may not be otherwise by possible by an automated oracle. For example, human oracles may be able to provide answers to unstructured data requests. Sample dialogue may include: "Does John update his address with you"? or "Do you have John's Meal Preferences"? or "Is John's previous employment salary X?" In some embodiments, the one or more human oracles may receive the request for data from the blockchain network (e.g., via the enterprise 106) and transmit the request for data to the data source of an off-chain enterprise (e.g., via the enterprise 122). The one or more human oracles may receive the requested data from the off-chain enterprise (e.g., via the enterprise 122) and transmit the requested data to the blockchain network (e.g., via the enterprise 106).

The oracle system 134 may include or be associated with one or more single sourced oracles and/or one or more multiple sourced oracles. In some embodiments, a single sourced oracle may be an oracle that queries a single data source for data. In some embodiments, a multiple sourced oracle may be an oracle that queries more than one data source for data. For example, if the enterprises 122, 124, 126 deposit data collectively in a common data source, then the single sourced oracle may query the common data source and retrieve the data. Alternatively, if the enterprises 122, 124, 126 deposit data separately in separate data sources, then the multiple sourced oracle may query the separate data sources and retrieve and aggregate the data together. In some embodiments, retrieval of the data may generate one or more events for a smart contract to begin executing.

In some embodiments, when receiving data from an oracle system (e.g., the oracle system 134), a smart contract may depend on the truth of the requested data provided by an off-chain enterprise (e.g., via the enterprise 122), which may result in having to trust a third party and, thereby, may potentially jeopardize the benefits of a decentralized blockchain. A potential problem may occur at the data source and/or the oracle system when the trust of such data source and/or oracle system becomes compromised, which may decrease the security in the blockchain network. For example, a trustworthy oracle system may be useless if the data retrieved from a data source is incorrect. Similarly, correct data retrieved from a trustworthy data source may be useless if an oracle system does not correctly transmit the requested data to the blockchain network (e.g., to the enterprise 106).

There are various approaches that may be used to reduce the risk of untrustworthiness of an oracle system. In some embodiments, a technical framework may be used to reduce the risk of an oracle system from tampering with data. For example, a TLS notary (or a comparable digital notary functionality) may be used to sign the data during its retrieval from a data source. Additionally, a secure hardware bridge may be created between a data source and a smart contract by using software guard extensions. Further, in some embodiments, multiple oracle systems may be used (i.e., instead of one oracle system as shown in the illustrative embodiment of FIG. 1) to aggregate data in order to reduce the susceptibility of misconduct by one oracle system. In some embodiments, decentralized oracles may also be used to reduce the risk of untrustworthiness of an oracle system. By way of example, one or more of ChainLink, WitNet, Oraclize, Town Crier, and/or other technologies and implementations may be used in accordance with some of the embodiments of the present disclosure. In some embodiments, a technical framework may be used to reduce the risk of tampering of data occurring at a centralized data source. For example, in some embodiments, multiple data sources may be used in a manner in which the multiple data sources create a consensus among the data sources and aggregate the data into a single response to the request for data from an oracle system.

Figure 2:
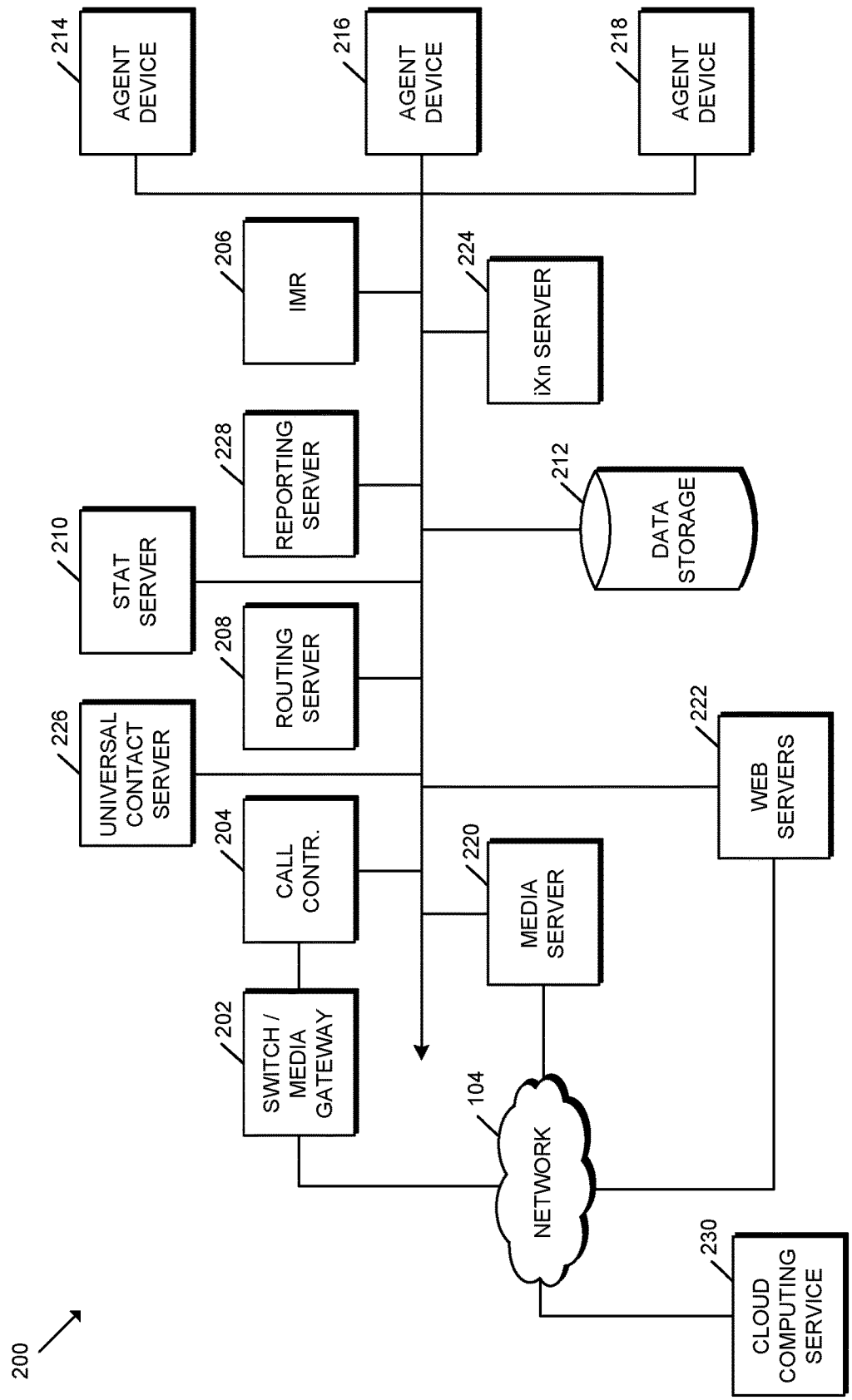
FIG. 2 is a simplified block diagram of at least one embodiment of at least one contact center system of the system of FIG. 1 for conducting a data transaction between enterprises using a permissioned blockchain infrastructure.

Referring now to FIG. 2, the contact center system 200 may be embodied as any system capable of providing contact center services (e.g., call center services, chat center services, SMS center services, etc.) to an end user and otherwise performing the functions described herein. The contact center system 200 may be illustrative of any of the contact center systems 114, 116, 118 shown in FIG. 1. Such contact center systems 114, 116, 118 may be collectively referred to herein as the contact center system 200. Depending on the particular embodiment, it should be appreciated that the contact center system 200 may be located on the premises of the enterprise utilizing the contact center system 200 and/or located remotely relative to the enterprise (e.g., in a cloud-based computing environment). In some embodiments, a portion of the contact center system 200 may be located on the enterprise's premises/campus while other portions of the contact center system 200 may be located remotely relative to the enterprise's premises/campus. As such, it should be appreciated that the contact center system 200 may be deployed in equipment dedicated to the enterprise or third-party service provider thereof and/or deployed in a remote computing environment such as, for example, a private or public cloud environment with infrastructure for supporting multiple contact centers (e.g., the contact center systems 114, 116, 118) for multiple enterprises (e.g., the enterprises 106, 108, 110). In some embodiments, the contact center system 200 includes resources (e.g., personnel, computers, and telecommunication equipment) to enable delivery of services via telephone and/or other communication mechanisms. Such services may include, for example, technical support, help desk support, emergency response, and/or other contact center services depending on the particular type of contact center. The various components of the contact center system 200 may also be distributed across various geographic locations and computing environments and not necessarily contained in a single location, computing environment, or even computing device.

The illustrative contact center system 200 includes the network 104, a switch/media gateway 202, a call controller 204, an IMR server 206, a routing server 208, a stat server 210, a data storage 212, agent devices 214, 216, 218, a multimedia/social media server 220, web servers 222, an interaction (iXn) server 224, a universal contact server 226, a reporting server 228, and a cloud computing service 230.

An end user (e.g., a customer and/or a potential customer) desiring to receive services from the contact center system 200 may initiate inbound communications (e.g., telephony calls, emails, chats, video chats, social media posts, etc.) to the contact center system 200 via the end user device 102. The switch/media gateway 202 may be embodied as any one or more types of devices/systems that are capable of performing the functions described herein. The switch/media gateway 202 may be coupled to the network 104 for receiving and transmitting telephony calls between the end user device 102 and the contact center system 200. The switch/media gateway 202 may include a telephony switch and/or communication switch configured to function as a central switch for agent level routing within the contact center system 200. The switch/media gateway 202 may be a hardware switching system or a soft switch implemented via software. For example, the switch/media gateway 202 may include an automatic call distributor, a private branch exchange (PBX), an IP-based software switch, and/or any other switch with specialized hardware and software configured to receive Internet-sourced interactions and/or telephone network-sourced interactions from the end user device 102, and route those interactions to, for example, the agent devices 214, 216, 218. In this example, the switch/media gateway 202 may establish a voice path/connection (not shown) between the end user device 102 and the agent devices 214, 216, 218, by establishing, for example, a connection between the end user device 102 and the agent devices 214, 216, 218.

In an embodiment, the switch/media gateway 202 may be coupled to a call controller 204. The call controller 204 may be embodied as any one or more types of devices/systems that are capable of performing the functions described herein. For example, the call controller 204 may serve as an adapter or interface between the switch/media gateway 202 and the remainder of the routing, monitoring, and other communication-handling components of the contact center system 200. The call controller 204 may be configured to process PSTN calls and/or VoIP calls. For example, the call controller 204 may be configured with computer-telephony integration (CTI) software for interfacing with the switch/media gateway 202 and contact center system 200 equipment. In one embodiment, the call controller 204 may include a session initiation protocol (SIP) server for processing SIP calls.

In some embodiments, the call controller 204 may, for example, extract data about the end user interaction such as the end user's telephone number (often known as the automatic number identification (ANI) number), or the end user's internet protocol (IP) address, or email address, and communicate with other contact center system 200 components in processing the interaction.

The IMR server 206 may be embodied as any one or more types of devices/systems that are capable of performing the functions described herein. For example, in some embodiments, the IMR server 206 may also be referred to herein as a self-help system or virtual assistant. The IMR server 206 may be similar to an interactive voice response (IVR) server, except that the IMR server 206 is not restricted to voice and may encompass a variety of media channels, including, for example, voice and text chat (e.g., implementing a chat bot). Considering voice as an example, however, the IMR server 206 may be configured with an IMR script for querying end users on their needs. For example, a contact center system 200 for a bank may tell end users, via the IMR script, to "press 1" if they wish to get an account balance. If this is the case, through continued interaction with the IMR server 206, end users may complete service without needing to speak with an agent. The IMR server 206 may also ask an open-ended question such as, for example, "How can I help you?" and the end user may speak or otherwise enter a reason for contacting the contact center. The end user's response may then be used by a routing server 208 to route the call or communication to an appropriate contact center resource.

If the communication is to be routed to an agent, the call controller 204 interacts with the routing server 208 (also referred to herein as an orchestration server) to find an appropriate agent for processing the interaction. The call controller 204 may be embodied as any one or more types of devices/systems that are capable of performing the functions described herein. The selection of an appropriate agent for routing an inbound interaction may be based, for example, on a routing strategy employed by the routing server 208, and further based on information about agent availability, skills, and other routing parameters provided, for example, by a statistics server 210 (also referred to herein as a stat server). The stat server 210 may be embodied as any one or more types of devices/systems that are capable of performing the functions described herein.

In some embodiments, the routing server 208 may query the data storage 212. The data storage 212 may be embodied as one or more databases, data structures, and/or data storage devices capable of storing data in the contact center system 200 or otherwise facilitating the storage of such data for the contact center system 200. For example, in some embodiments, the data storage 212 may include one or more cloud storage buckets. In some embodiments the data storage 212 may store information relating to agent data (e.g., agent profiles, and/or schedules), end user data (e.g. end user profiles, contact information, service level agreement requirements, nature of previous end user contacts and actions taken by the contact center system 200 to resolve any end user issues), and/or interaction data (e.g., details of each interaction with an end user, including reason for the interaction, disposition data, time on hold, and/or handle time). In some embodiments, some of the data (e.g., end user profile data) may be maintained in an end user relations management (CRM) database hosted in the data storage 212. The data storage 212 may also be embodied as any device or component, or collection of devices or components, capable of short-term or long-term storage of data. Although the data storage 212 is described herein as data storages and databases, it should be appreciated that the data storage 212 may include both a database (or other type of organized collection of data and structures) and data storage for the actual storage of the underlying data. The data storage 212 may store various data useful for performing the functions described herein.

After an appropriate agent is identified as being available to handle a communication, a connection may be made between the end user device 102 and agent devices 214, 216, 218 of the identified agent. The agent devices 214, 216, 218 may be embodied as any one or more types of devices/systems that are capable of performing the functions described herein. Collected information about the end user and/or the end user's historical information may also be provided to the agent devices 214, 216, 218 for aiding the agent in better servicing the communication. The agent devices 214, 216, 218 may include a telephone adapted for regular telephone calls, Von' calls, etc. The agent devices 214, 216, 218 may also include a computer for communicating with one or more servers of the contact center system 200 and performing data processing associated with contact center operations, and for interfacing with end users via voice and other multimedia communication mechanisms.

The multimedia/social media server 220 (also referred to herein as a media server) may be embodied as any one or more types of devices/systems that are capable of performing the functions described herein. For example, in some embodiments, the multimedia/social media server 220 may engage in media interactions other than voice interactions with the end user device 102 and/or web servers 222. The media interactions may be related, for example, to email, vmail (voice mail through email), chat, video, text-messaging, web, social media, and/or co-browsing. In this regard, the multimedia/social media server 220 may take the form of any IP router conventional in the art with specialized hardware and software for receiving, processing, and forwarding multi-media events.

The web servers 222 may include, for example, social interaction site hosts for a variety of known social interaction sites to which an end user may subscribe, such as, for example, Facebook, Twitter, Instagram, etc. The web servers 222 may be embodied as any one or more types of devices/systems that are capable of performing the functions described herein. Although in the embodiment of FIG. 2 the web servers 222 are depicted as being part of the contact center system 200, the web servers 222 may also be provided by third parties and/or maintained outside of the contact center system 200 premises. The web servers 222 may also provide web pages for the enterprises 106, 108, 110 that are being supported by the contact center systems 114, 116, 118. End users may browse the web pages and get information about the products and services of the enterprises 106, 108, 110. The web pages may also provide a mechanism for contacting the contact center system 200, via, for example, web chat (e.g., with a live agent and/or with a chat bot), voice call, email, and/or WebRTC.

The web servers 222 may also provide public facing application programming interfaces (APIs) for interacting with the contact center systems 114, 116, 118 and/or the enterprises 106, 108, 110. For example, the web servers may implement APIs in accordance with the Representational State Transfer (REST) architectural style (a "RESTful" web service), where request and response payloads may be transmitted in data formats such as Extensible Markup Language (XML) or JavaScript Object Notation (JSON). As another example, the web servers may implement APIs in accordance with markup languages and/or protocols such as the Web Services Description Language (WSDL) and Simple Object Access Protocol (SOAP), or using proprietary protocols.

In addition to real-time interactions, deferrable (also referred to as back-office or offline) interactions/activities may also be routed to the agent devices 214, 216, 218. Such deferrable activities may include, for example, responding to emails, responding to letters, attending training seminars, or any other activity that does not entail real time communication with an end user. In this regard, an interaction (iXn) server 224 interacts with the routing server 208 for selecting an appropriate agent device 214, 216, 218 to handle the activity. The iXn server 224 may be embodied as any one or more types of devices/systems that are capable of performing the functions described herein. Once assigned to an agent device 214, 216, 218, an activity may be pushed to the agent, or may appear in the agent's workbin of an agent device 214, 216, 218 as a task to be completed by the agent. The agent's workbin may be implemented via any data structure conventional in the art, such as, for example, a linked list and/or array. The workbin may be maintained, for example, in buffer memory of the agent devices 214, 216, 218.

The universal contact server 226 may be embodied as any one or more types of devices/systems that are capable of performing the functions described herein. The universal contact server 226 may be configured to retrieve information stored in the CRM database and direct information to be stored in the CRM database. The universal contact server 226 may also be configured to facilitate maintaining a history of end users' preferences and interaction history, and to capture and store data regarding comments from agents and/or end user communication history.

The reporting server 228 may be embodied as any one or more types of devices/systems that are capable of performing the functions described herein. The reporting server 228 may be configured to generate reports from data aggregated by the statistics server 210. Such reports may include near real-time reports or historical reports concerning the state of resources, such as, for example, average waiting time, abandonment rate, and/or agent occupancy. The reports may be generated automatically or in response to specific requests from a requestor (e.g., agent/administrator, contact center application, etc.).

The end user device 102 and the various components of the contact center system 200 may communicate with a cloud computing service 230 (e.g., cloud computing services operated by a third party) over the network 104. The cloud computing service 230 may be embodied as any one or more types of devices/systems that are capable of performing the functions described herein. Examples of cloud computing services 230 include infrastructure as a service (IaaS) and proprietary platforms providing various particular computing services such as data storage, data feeds, and data synchronization.

In the illustrative embodiment, the contact center system 200 may be embodied as a cloud-based system executing in a cloud computing environment; however, it should be appreciated that, in other embodiments, the contact center system 200 or a portion thereof (e.g., one or more of the network 104, the switch/media gateway 202, the call controller 204, the IMR server 206, the routing server 208, the stat server 210, the data storage 212, the agent devices 214, 216, 218, the multimedia/social media server 220, the web servers 222, the interaction (iXn) server 224, the universal contact server 226, the reporting server 228, and the cloud computing service 230, and/or one or more portions thereof) may be embodied as one or more systems executing outside of a cloud computing environment.

In cloud-based embodiments, one or more of the network 104, the switch/media gateway 202, the call controller 204, the IMR server 206, the routing server 208, the stat server 210, the data storage 212, the agent devices 214, 216, 218, the multimedia/social media server 220, the web servers 222, the interaction (iXn) server 224, the universal contact server 226, the reporting server 228, and/or the cloud computing service 230 (and/or one or more portions thereof) may be embodied as a server-ambiguous computing solution, for example, that executes a plurality of instructions on-demand, contains logic to execute instructions only when prompted by a particular activity/trigger, and does not consume computing resources (or consumes nominal resources) when not in use. That is, the contact center system 200, the network 104, the switch/media gateway 202, the call controller 204, the IMR server 206, the routing server 208, the stat server 210, the data storage 212, the agent devices 214, 216, 218, the multimedia/social media server 220, the web servers 222, the interaction (iXn) server 224, the universal contact server 226, the reporting server 228, and/or the cloud computing service 230 (and/or one or more portions thereof) may be embodied as a virtual computing environment residing "on" a computing system (e.g., a distributed network of devices) in which various $3^{rd}$ party virtual functions may be executed corresponding with the functions of the contact center system 200, the network 104, the switch/media gateway 202, the call controller 204, the IMR server 206, the routing server 208, the stat server 210, the data storage 212, the agent devices 214, 216, 218, the multimedia/social media server 220, the web servers 222, the interaction (iXn) server 224, the universal contact server 226, the reporting server 228, and/or the cloud computing service 230 (and/or one or more portions thereof) described herein. For example, when an event occurs (e.g., data is transferred to the contact center system 200 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made (e.g., via an appropriate user interface to the contact center system 200), the appropriate virtual function(s) may be executed to perform the actions before eliminating the instance of the virtual function(s).

It should be appreciated that each of the end user device 102, network 104, enterprises 106, 108, 110, enterprise system 112, and contact center systems 114, 116, 118 may be embodied as (or include) one or more computing devices similar to the computing device 300 described below in reference to FIG. 3. For example, in the illustrative embodiment, each of end user device 102, network 104, enterprises 106, 108, 110, enterprise system 112, and contact center systems 114, 116, 118 may include a processing device 302 and a memory 306 having stored thereon operating logic 308 (e.g., a plurality of instructions) for execution by the processing device 302 for operation of the corresponding device.

Figure 3:
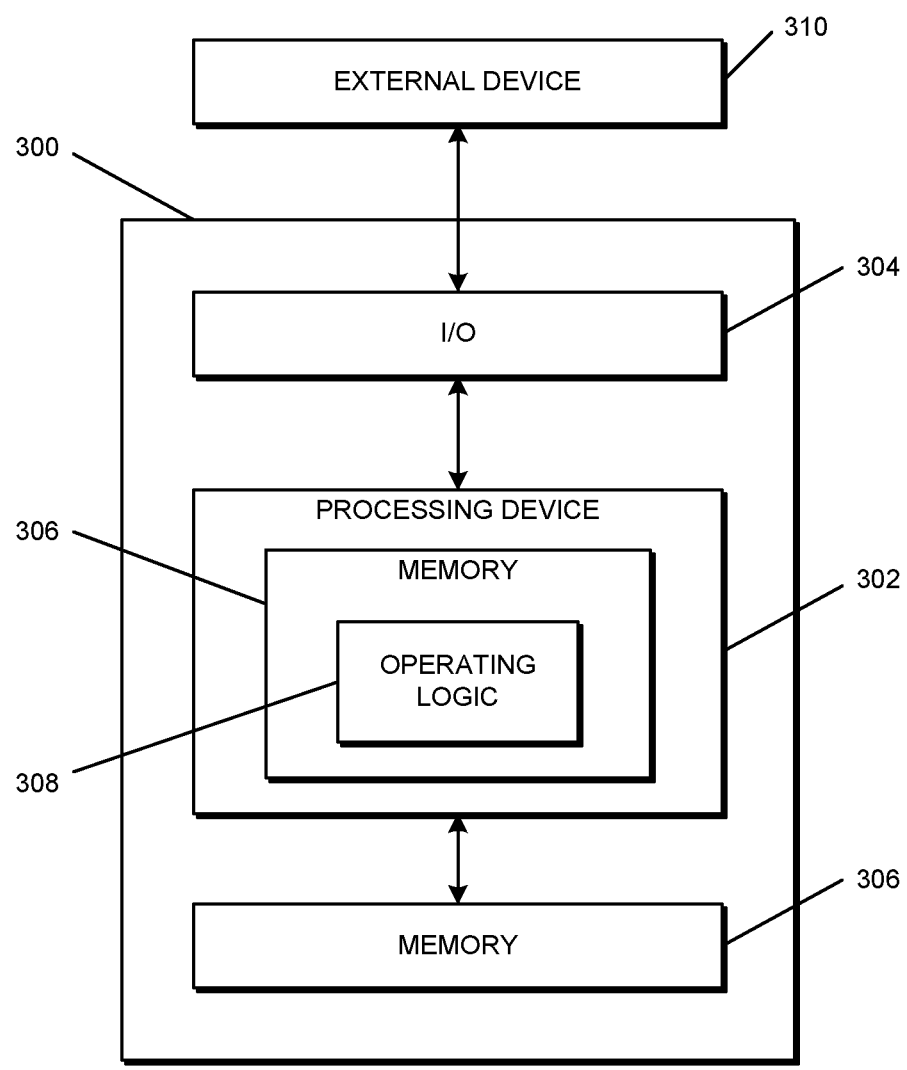
FIG. 3 is a simplified block diagram of at least one embodiment of a computing system.

Referring now to FIG. 3, a simplified block diagram of at least one embodiment of a computing device 300 is shown. The illustrative computing device 300 depicts at least one embodiment of an end user device, a network, enterprises, an enterprise system and/or a contact center system that may be utilized in connection with the end user device 102, the network 104, the enterprises 106, 108, 110, the enterprise system 112, and/or the contact center systems 114, 116, 118 illustrated in FIG. 1. Further, in some embodiments, one or more of the switch/media gateway 202, the call controller 204, the IMR server 206, the routing server 208, the stat server 210, the data storage 212, the agent devices 214, 216, 218, the multimedia/social media server 220, the web servers 222, the interaction (iXn) server 224, the universal contact server 226, the reporting server 228, and the cloud computing service 230 of FIG. 2 (and/or a portion thereof) may be embodied as or be executed by one or more computing devices similar to the computing device 300. Depending on the particular embodiment, the computing device 300 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 300 includes a processing device 302 that executes algorithms and/or processes data in accordance with operating logic 308, an input/output device 304 that enables communication between the computing device 300 and one or more external devices 310, and memory 306 which stores, for example, data received from the external device 310 via the input/output device 304.

The input/output device 304 allows the computing device 300 to communicate with the external device 310. For example, the input/output device 304 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 300 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 300. The input/output device 304 may include hardware, software, and/or firmware suitable for performing the techniques described herein.

The external device 310 may be any type of device that allows data to be inputted or outputted from the computing device 300. For example, in various embodiments, the external device 310 may be embodied as the end user device 102, the network 104, the enterprises 106, 108, 110, the enterprise system 112, the contact center systems 114, 116, 118, switch/media gateway 202, the call controller 204, the IMR server 206, the routing server 208, the stat server 210, the data storage 212, the agent devices 214, 216, 218, the multimedia/social media server 220, the web servers 222, the interaction (iXn) server 224, the universal contact server 226, the reporting server 228, and/or the cloud computing service 230. Further, in some embodiments, the external device 310 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 310 may be integrated into the computing device 300.

The processing device 302 may be embodied as any type of processor(s) capable of performing the functions described herein. In particular, the processing device 302 may be embodied as one or more single or multi-core processors, microcontrollers, or other processor or processing/controlling circuits. For example, in some embodiments, the processing device 302 may include or be embodied as an arithmetic logic unit (ALU), central processing unit (CPU), digital signal processor (DSP), and/or another suitable processor(s). The processing device 302 may be a programmable type, a dedicated hardwired state machine, or a combination thereof. Processing devices 302 with multiple processing units may utilize distributed, pipelined, and/or parallel processing in various embodiments. Further, the processing device 302 may be dedicated to performance of just the operations described herein, or may be utilized in one or more additional applications. In the illustrative embodiment, the processing device 302 is programmable and executes algorithms and/or processes data in accordance with operating logic 308 as defined by programming instructions (such as software or firmware) stored in memory 306. Additionally or alternatively, the operating logic 308 for processing device 302 may be at least partially defined by hardwired logic or other hardware. Further, the processing device 302 may include one or more components of any type suitable to process the signals received from input/output device 304 or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable type, such as a disk, tape, memory stick, cartridge, and/or other suitable portable memory. In operation, the memory 306 may store various data and software used during operation of the computing device 300 such as operating systems, applications, programs, libraries, and drivers. It should be appreciated that the memory 306 may store data that is manipulated by the operating logic 308 of processing device 302, such as, for example, data representative of signals received from and/or sent to the input/output device 304 in addition to or in lieu of storing programming instructions defining operating logic 308. As shown in FIG. 3, the memory 306 may be included with the processing device 302 and/or coupled to the processing device 302 depending on the particular embodiment. For example, in some embodiments, the processing device 302, the memory 306, and/or other components of the computing device 300 may form a portion of a system-on-a-chip (SoC) and be incorporated on a single integrated circuit chip.

In some embodiments, various components of the computing device 300 (e.g., the processing device 302 and the memory 306) may be communicatively coupled via an input/output subsystem, which may be embodied as circuitry and/or components to facilitate input/output operations with the processing device 302, the memory 306, and other components of the computing device 300. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 300 may include other or additional components, such as those commonly found in a typical computing device (e.g., various input/output devices and/or other components), in other embodiments. It should be further appreciated that one or more of the components of the computing device 300 described herein may be distributed across multiple computing devices. In other words, the techniques described herein may be employed by a computing system that includes one or more computing devices. Additionally, although only a single processing device 302, I/O device 304, and memory 306 are illustratively shown in FIG. 3, it should be appreciated that a particular computing device 300 may include multiple processing devices 302, I/O devices 304, and/or memories 306 in other embodiments. Further, in some embodiments, more than one external device 310 may be in communication with the computing device 300.

Figure 4:
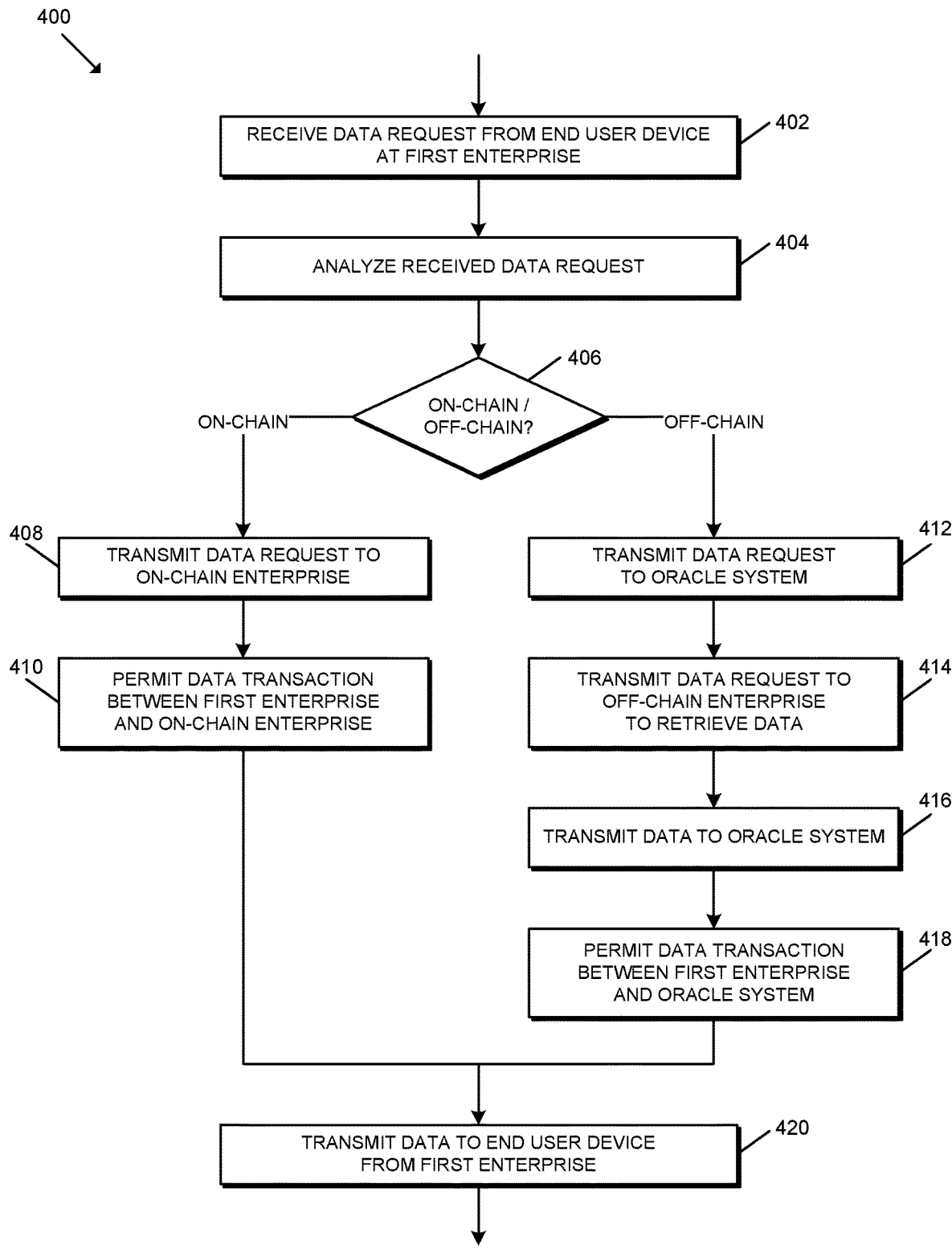
FIG. 4 is a simplified flow diagram of at least one embodiment of a method for conducting a data transaction between enterprises using a permissioned blockchain infrastructure using the system of FIG. 1.

Referring now to FIG. 4, in use, the system 100 may execute a method 400 for conducting a data transaction between enterprises using a permissioned blockchain infrastructure. It should be appreciated that the particular blocks of the method 400 are illustrated by way of example, and such blocks may be combined or divided, added or removed, and/or reordered in whole or in part depending on the particular embodiment, unless stated to the contrary. Prior to execution of the method 400, it should be appreciated that an end user may interact with the end user device 102 via a user interface of the application 120 (e.g., the personal bot system and/or a graphical user interface) in order to communicate a request for data to an enterprise (e.g., the system 100, via the enterprise 106, may receive a request for data). For example, an end user may communicate an issue with her cable internet service to an enterprise (e.g., the enterprise 106) via the application 120 (e.g., the personal bot system).

The illustrative method 400 may begin with block 402 in which the system 100 (e.g., via the enterprise 106 or, more specifically, the contact center system 114 of the enterprise 106) may receive the request for data from the end user device 102 (e.g., via the application 120 or, more particularly, the personal bot system). In some embodiments, the request for data may be generated by the end user device 102 utilizing the application 120 (e.g., the personal bot system). In some embodiments, the request for data may be generated by the end user device 102 utilizing at least one of an email, a chat, a website search, a survey feedback, a voice, or a social media conversation. In some embodiments, the end user device 102 may be an IoT device. For example, the IoT readings of an end user's air conditioner may generate an interaction with an enterprise that the end user's air conditioner compressor may have problems and may need service.

In block 404, the enterprise 106 (e.g., via the contact center system 114) may analyze the request for data and may determine that the enterprise 106 does not possess the requested data. Referring back to the cable internet service example, the enterprise 106 may determine that it does not have a solution to address the issue with the end user's cable internet service. In block 406, the enterprise 106 (e.g., via the contact center system 114) may utilize a technological platform to determine whether one or more of the enterprises 106, 108, 110 in the enterprise system 112 possesses the requested data or one or more of the enterprises 122, 124, 126 possesses the requested data. In other words, the technological platform may be leveraged (e.g., by the enterprise 106) to determine whether an on-chain enterprise (e.g., one or more of the enterprises 108, 110) or an off-chain enterprise (e.g., one or more of the enterprises 122, 124, 126) possesses the requested or desired data. If the technical platform determines that an on-chain enterprise (e.g., one or more of the enterprises 108, 110 in the enterprise system 112) possesses the requested data, the method 400 may advance to block 408 in which the technological platform may communicate to the enterprise 106 information regarding the enterprise possessing the requested data (e.g., the enterprise 108). For example, the technological platform may determine that enterprise 108 possesses the solution to address the issue with the end user's cable internet service. The enterprise 106 (e.g., via the contact center system 114) may then transmit the request for data to the enterprise 108.

In block 410, the system 100 may permit a data transaction between the enterprise 106 (e.g., via the contact center system 114) and the enterprise 108 (e.g., via the contact center system 116) utilizing a permissioned blockchain infrastructure. For example, the enterprise 108 may share with the enterprise 106 the solution to address the issue with the end user's cable internet service. In some embodiments, the system 100 may execute the method 500 of FIG. 5 (or a portion thereof) as described in detail below in association with the method 400 of FIG. 4.

It should be appreciated that a blockchain may refer to a suite of distributed ledger technologies that can be programmed to record and track the data transactions of the present disclosure. The blockchain is a combination of three technologies, including cryptography, a peer-to-peer network, and a governance structure. The blockchain may store data in batches, called blocks, which are linked together in a chronological manner to form a continuous "chain" of blocks. If a change occurs to the data recorded in a particular block, the change may be stored in a new block showing the change at a particular date and time (e.g., "X changed to Y on 8/23/2020 at 10:45 AM EDT"). The blockchain may be decentralized and distributed across a network of nodes. The decentralizing of data may reduce the ability for data tampering. Each enterprise within the blockchain network (e.g., within the system 100) may maintain, approve, and update new blocks.

The blockchain governance elements may be categorized into four elements, including, the consensus algorithm, incentives, information, and governing structure. For example, the blockchain network may leverage one or more consensus algorithms to execute the data transaction verification within the blockchain network. Consensus may be a method of reaching agreement among the different nodes on the blockchain network. Different blockchain systems may implement different consensus algorithms which can benefit the entities that validate new data transactions and record the transactions on the blockchain (i.e., the miners) directly or indirectly. For example, in some embodiments, the blockchain network may utilize a proof of work algorithm, a delayed proof of work algorithm, a proof of stake algorithm, a delegated proof of stake algorithm, a leased proof of stake algorithm, a proof of stake velocity algorithm, a proof of elapsed time algorithm, a practical Byzantine fault tolerance algorithm, a simplified Byzantine fault tolerance algorithm, a delegated Byzantine fault tolerance algorithm, a proof of activity algorithm, a proof of authority algorithm, a proof of reputation algorithm, a proof of history algorithm, a proof of importance algorithm, a proof of capacity algorithm, a proof of burn algorithm, a proof of weight algorithm, and/or other suitable consensus algorithms, techniques, and/or mechanisms.

Incentives may permit the different entities (e.g., miners, etc.) to help run the blockchain by providing nodes incentives for their actions. There may be an incentive for every entity that is participating in the functionality of the network. Information may also be critical to the blockchain. As the blockchain is decentralized, considerable amounts of information may need to be in the blockchain network.

The blockchain governance structure may ensure that the blockchain can function efficiently and seamlessly while in active development by developers. The blockchain governance may rely on four central communities to manage the blockchain governance, including the core developers, the node operators, the token holders, and the blockchain team. The core developers may be responsible for developing, managing, and maintaining the core code of the blockchain. The core developers may write, update, or remove code that has a direct impact on the blockchain's functionality and, thereby, can impact every enterprise in the blockchain network. The node operators may be responsible for carrying the blockchain ledger full copy. The node operators may run operations from their computers and are responsible for deciding whether features will run on nodes or not. The node operators may also provide storage and computation for the blockchain operations. Code developers may need to consult the node operators before the code developers decide on any features. The token holders may be the enterprises that are part of the blockchain network by holding blockchain tokens. Token holders may take part in the governance through voting rights when changes are made to the blockchain, including, for example, feature changes and set prices. In certain embodiments, token holders may also be investors having a certain token percentage that affects their voting position. The blockchain team may be an enterprise that has different roles to manage the blockchain, including, for example, funding, negotiation, and communication. The blockchain team may act as a mediator to negotiate for features between the token holders, the core developers, and node operators.

The permissioned blockchain infrastructure and the blockchain network of the present disclosure may require access to be part of the infrastructure and network. A control layer may run on top of the blockchain that governs the actions performed by the allowed enterprises. Compared to a public blockchain infrastructure, the permissioned blockchain infrastructure may offer better performance because of the limited number of nodes included in the infrastructure, which may remove unnecessary computations required to reach consensus in the infrastructure. Additionally, the permissioned blockchain infrastructure may include its own pre-determined nodes for validating the data transaction. In contrast to a public blockchain, the permissioned blockchain infrastructure may include a governance structure that requires less time to update the rules over the blockchain network. For example, the nodes included in the permissioned blockchain infrastructure may work together to accomplish updates over the blockchain faster than the nodes in a public blockchain that may work in opposition of each other. The permissioned blockchain infrastructure of the present disclosure may also restrict the consensus participants making a permissioned blockchain network highly configured and controlled by the enterprises in the network. The permissioned blockchain infrastructure of the present disclosure may enable a data transaction among enterprises (e.g., the enterprises 106, 108, 110) in the enterprise system 112.

Referring back to block 406, if the technical platform determines that an off-chain enterprise (e.g., one or more of the enterprises 122, 124, 126) possesses the requested data, the method 400 may advance to block 412 in which the technological platform may communicate to the oracle system 134 information regarding the enterprise possessing the requested data (e.g., the enterprise 122). For example, the technological platform may determine that the enterprise 122 possesses the solution to address the issue with the end user's cable internet service. The enterprise 106 (e.g., via the contact center system 114) may then transmit the request for data to the oracle system 134. In block 414, the oracle system 134 may transmit the request for data to the enterprise 122. In block 416, the enterprise 122 may transmit the requested data to the oracle system 134. In block 418, the system 100 may permit a data transaction between the enterprise 106 (e.g., via the contact center system 114) and the oracle system 134 utilizing a permissioned blockchain infrastructure. For example, the oracle 134 may share with the enterprise 106 the solution to address the issue with the end user's cable internet service. In some embodiments, the system 100 may execute the method 500 of FIG. 5 (or a portion thereof) as described in detail below in association with the method 400 of FIG. 4.

In block 420, the system 100 (e.g., via the enterprise 106) may transmit the requested data received from the enterprise 108 or the oracle system 134 to the end user device 102 (e.g., via the application 120 or, more particularly, the personal bot system). For example, the enterprise 106 may share with the end user device 102 the solution to address the issue with the end user's cable internet service.

Although the blocks 402-420 are described in a relatively serial manner, it should be appreciated that various blocks of the method 400 may be performed in parallel in some embodiments.

Figure 5:
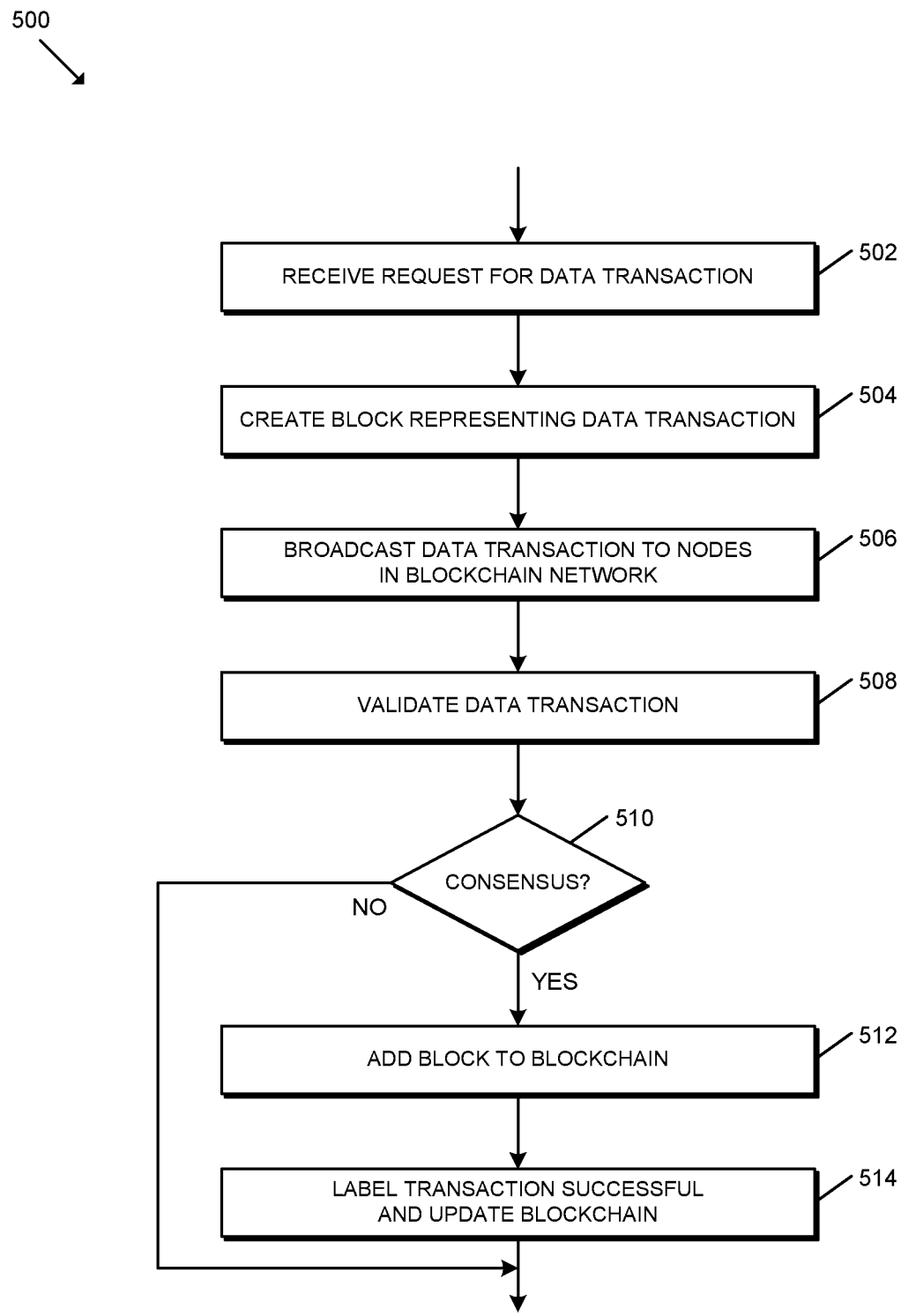
FIG. 5 is a simplified flow diagram of at least one embodiment of a method for conducting a data transaction between enterprises using a permissioned blockchain infrastructure using the system of FIG. 1.

Referring now to FIG. 5, in use, the system 100 may execute a method 500 for conducting a data transaction between enterprises using a permissioned blockchain infrastructure. It should be appreciated that the particular blocks of the method 500 are illustrated by way of example, and such blocks may be combined or divided, added or removed, and/or reordered in whole or in part depending on the particular embodiment, unless stated to the contrary. Prior to execution of the method 500, it should be appreciated that an end user may interact with the end user device 102 via a user interface of the application 120 (e.g., the personal bot system and/or a graphical user interface) in order to communicate a request for data to an enterprise (e.g., the system 100, via the end user device 102, may receive a request for data).

The system 100 (e.g., via the enterprise 106 or, more specifically in some embodiments, the contact center system 114 of the enterprise 106) may receive the request for data from the end user device 102 (e.g., via the application 120 or, more particularly, the personal bot system). The enterprise 106 (e.g., via the contact center system 114) may analyze the request for data, may determine that the enterprise 106 does not possess the requested data, may determine that enterprise 108 possesses the requested data among the enterprises included in the enterprise system, and may transmit the request for data to the enterprise 108. It should be that the system 100 may utilize any suitable blockchain technology to perform the method 500 of FIG. 5 and, therefore, one or more of the blocks of the method 500 may be varied based on aspects associated with the particular blockchain technology.

The illustrative method 500 begins with block 502 in which the system 100 (e.g., via the enterprise 108 or, more specifically, the contact center system 116) may receive a request for a data transaction from an enterprise (e.g., via the enterprise 106 or, more specifically, the contact center system 114). A node may initiate a data transaction and may sign the data transaction with its private key. In some embodiments, a node may be a computing device 300. Nodes may form the infrastructure of the blockchain. For example, the nodes on the blockchain may be connected to each other and may constantly exchange the latest blockchain data. In some embodiments, the nodes may store, transmit, and preserve the blockchain data. In some embodiments, the private key may generate a unique digital signature ensuring that no entity can alter the signature.

In block 504, a block representing the data transaction may be created in the blockchain network. In block 506, the data transaction may be published to each node in the blockchain network. In block 508, each node in the blockchain network may verify whether the data transaction is valid or not (i.e., validate the data transaction). In some embodiments, the nodes in the blockchain network may use one or more consensus algorithms to validate the transaction. For example, the nodes in the blockchain network may use one or more of the suitable consensus algorithms, techniques, and/or mechanisms described above in reference to the method 400 of FIG. 4. In block 510, the blockchain network may determine whether consensus has been reached among the nodes in the blockchain network. If the blockchain network determines that consensus has been reached among the nodes in the blockchain network, the method 500 may advance to block 512 in which the blockchain network may add the block to the blockchain. The block may include a timestamp and unique identification to secure the block from alteration. If the blockchain network determines that consensus has not been reached among the nodes in the blockchain network, the method 500 may terminate (e.g., such that the data transaction will be unsuccessful). In block 514, the blockchain network may label the data transaction as successful and update each node in the blockchain network with the block (e.g., the requested data may be provided to the enterprise 106 by the enterprise 108). When the block is added to the blockchain, the block may link itself to the previous block in the blockchain. When the next new block arrives at the blockchain network, the next new block will cryptographically link itself to the block added in block 512 of FIG. 5.

Although the blocks 502-514 are described in a relatively serial manner, it should be appreciated that various blocks of the method 500 may be performed in parallel in some embodiments. After execution of the method 500, it should be appreciated that the system 100 (e.g., via the enterprise 106) may transmit the requested data received from the enterprise 108 to end user device 102 (e.g., via the application 120 or, more particularly, the personal bot system).

Figure 6:
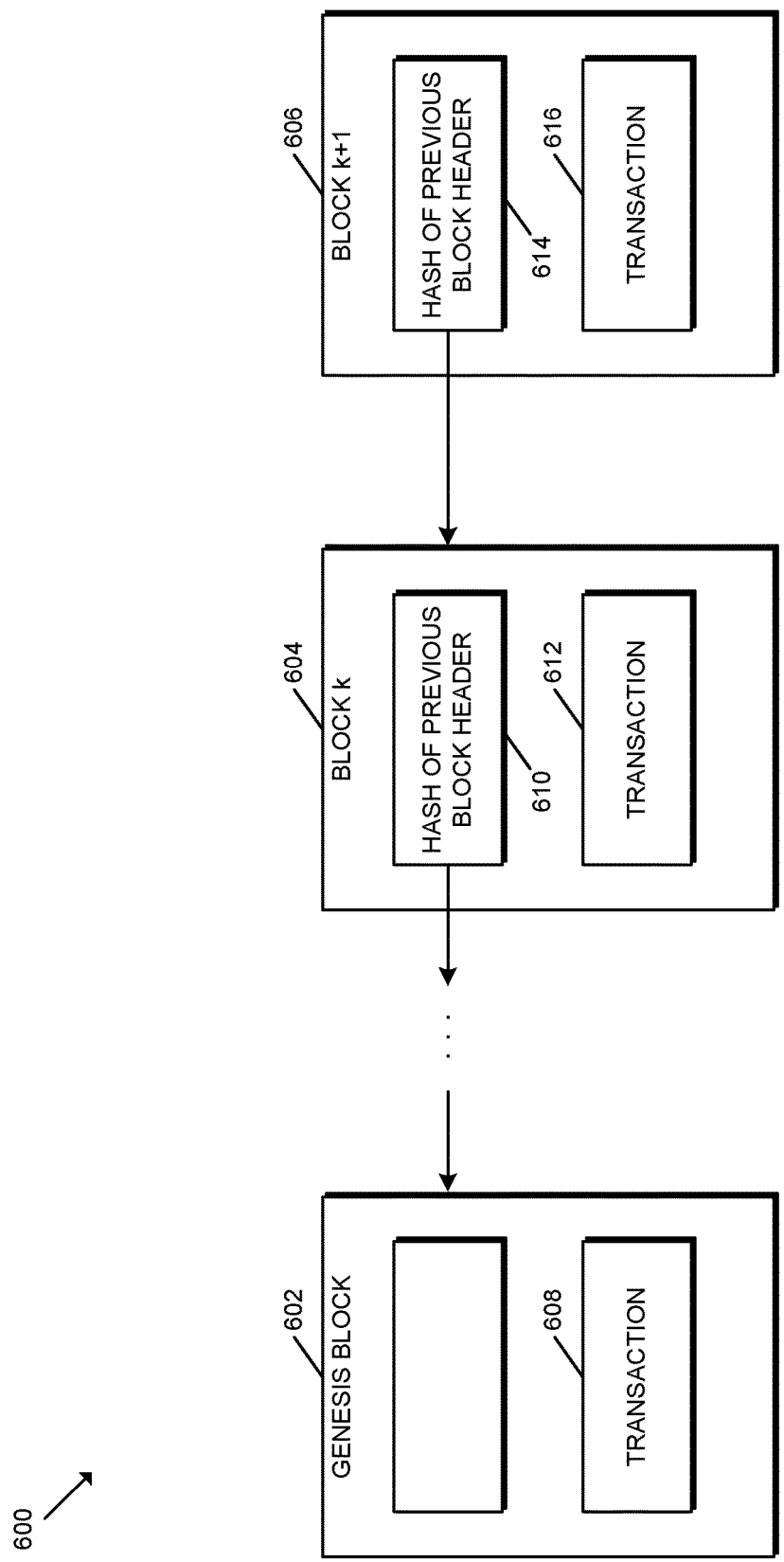
FIGS. 6-7 are simplified block diagrams of at least one embodiment of a blockchain architecture.

Referring now to FIG. 6, a blockchain architecture includes a partial blockchain 600 including a genesis block 602, a block k 604, and a block k+1 606. It should be appreciated that the blocks 602, 604, 606 illustrated in the blockchain 600 may include only a portion of the full blockchain 600, such that one or more additional blocks may be included between the genesis block 602 and the block k 604 (e.g., represented by the ellipsis). If the blockchain 600 includes only the three blocks 602, 604, 606, then the genesis block 602 may also be described as the block k−1. As described herein, blockchains (e.g., the blockchain 600) include transactions that are recorded/saved to the respective blocks and ordered in chronological order. As such, the blocks of the blockchain 600 may be timestamped.

Each of the blocks in the illustrative blockchain 600 includes a transaction and a hash of the previous block's header (e.g., previous block to be added to the blockchain 600 chronologically). For example, the genesis block 602 includes the transaction 608, the block k 604 includes a hash 610 of the previous block header (i.e., the header of block k−1, not shown) and a transaction 612, and the block k+1 606 includes a hash 614 of the previous block header (i.e., the header of the block k 604) and a transaction 616. Because the genesis block 602 is the first block on the blockchain 600 and therefore not "linked" to a previous block on the blockchain 600, the genesis block 602 does not include a hash of a previous block header. Instead, in some embodiments, the location on the block reserved for the hash of the previous block header may be set to zero (or another predefined value) on the genesis block 602.

It should be appreciated that the transactions of the blockchain 600 (e.g., the transactions 608, 612, 616, etc.) may record various interactions and/or events occurring within the system 100. For example, such interactions/events may include interactions between an end user (or other person) and an enterprise 106, 108, 110, interactions between the various enterprises 106, 108, 110 within the system, events occurring within a particular enterprise 106, 108, 110, and/or other relevant interactions/events within the system 100. By way of example, one or more of the transactions may include data indicating that an end user (e.g., customer) reported a loss of network connection with an internet service provider, an end user booked an international trip to another country, an end user provided feedback regarding satisfaction with a particular enterprise agent, an end user shared specific preferences with an enterprise 106, 108, 110 (e.g., an airline), an enterprise 106, 108, 110 shared data (e.g., user data) with another enterprise 106, 108, 110, an enterprise 106, 108, 110 saved new interests about an end user or other person, and/or other relevant information.

It should be appreciated that the data transfer and/or interactions may be initiated by an end user's interaction with personal bots, various enterprise touch points (e.g., email chat, website searches, survey feedback, phone, messengers, applications, social media conversations, etc.), end user IoT device data/activity (e.g., an IoT device indicating that mechanical equipment may need service), and/or otherwise.

Figure 7:
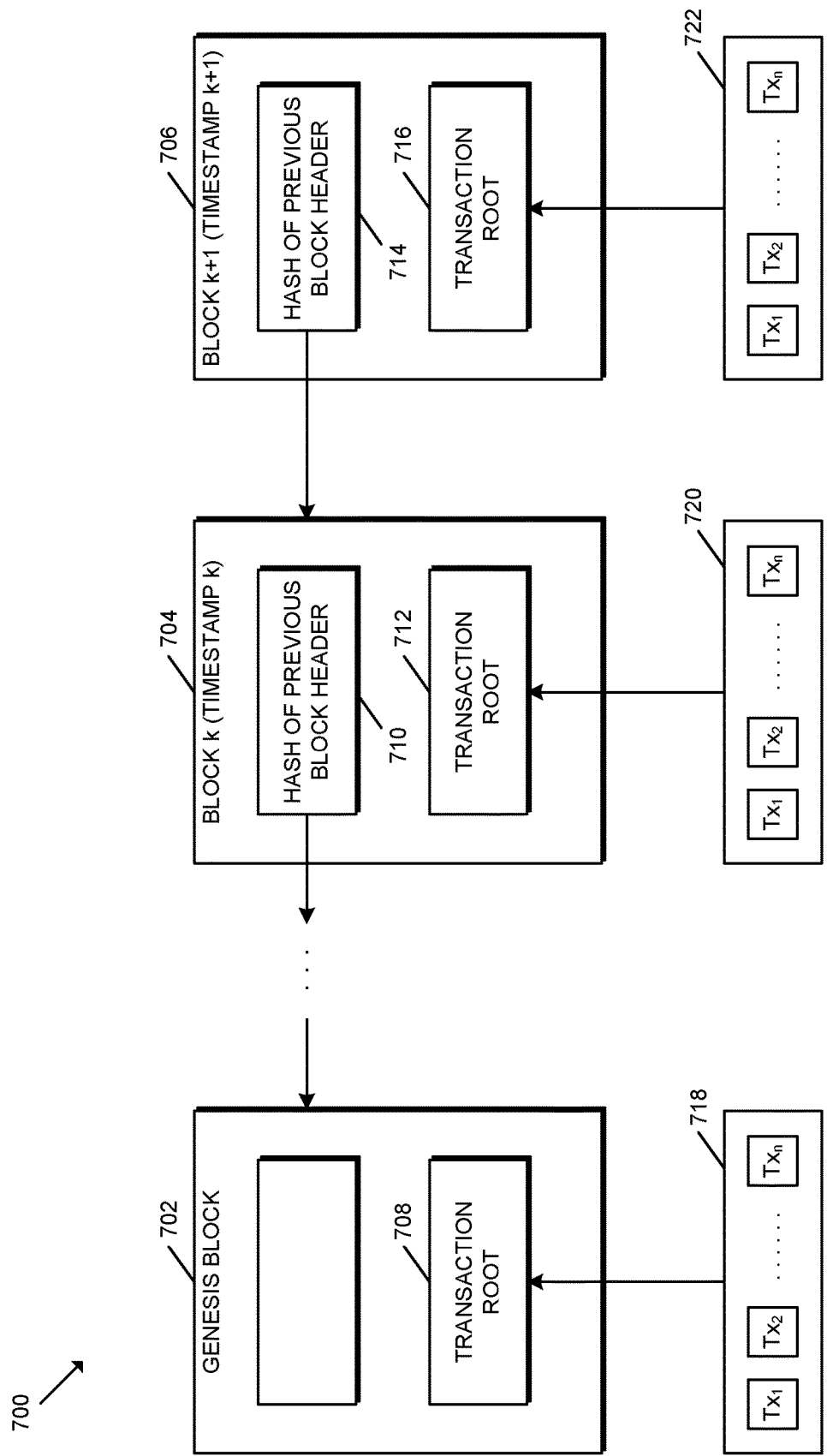

Referring now to FIG. 7, a blockchain architecture includes a partial blockchain 700 including a genesis block 702, a block k 704, and a block k+1 706. It should be appreciated that the blocks 702, 704, 706 illustrated in the blockchain 700 may include only a portion of the full blockchain 700, such that one or more additional blocks may be included between the genesis block 702 and the block k 704 (e.g., represented by the ellipsis). If the blockchain 700 includes only the three blocks 702, 704, 706, then the genesis block 702 may also be described as the block k−1.

Each of the blocks in the illustrative blockchain 700 includes a transaction root and a hash of the previous block's header (e.g., previous block to be added to the blockchain 700 chronologically). For example, the genesis block 702 includes the transaction root 708, the block k 704 includes a hash 710 of the previous block header (i.e., the header of block k−1, not shown) and a transaction root 712, and the block k+1 706 includes a hash 714 of the previous block header (i.e., the header of the block k 704) and a transaction root 716. Because the genesis block 702 is the first block on the blockchain 700 and therefore not "linked" to a previous block on the blockchain 700, the genesis block 702 does not include a hash of a previous block header. Instead, in some embodiments, the location on the block reserved for the hash of the previous block header may be set to zero (or another predefined value) on the genesis block 702.

It should be appreciated that multiple transactions may be stored to a particular block of a blockchain (e.g., the blockchain 700) in some embodiments. For example, as depicted in FIG. 7, the blockchain 700 includes transactions 718 ($T_{X_1}, T_{X_2}, \ldots, T_{X_n}$) included in or otherwise linked to the transaction root 708 of the genesis block 702, transactions 720 ($T_{X_1}, T_{X_2}, \ldots, T_{X_n}$) included in or otherwise linked to the transaction root 712 of the block 704 (with timestamp k), and transactions 722 ($T_{X_1}, T_{X_2}, \ldots, T_{X_n}$) included in or otherwise linked to the transaction root 716 of block (with timestamp k+1). In particular, in some embodiments, a blockchain (e.g., the blockchain 700) may group transactions based on the interval/timestamp as Merkle trees within a block. For example, the transactions 720 may include all transactions (or all of a particular type of transaction) between timestamps i−1 and i, and the transactions 722 may include all transactions (or all of a particular type of transaction) between timestamps i and i+1. Further, in some embodiments, the transactions may be grouped based on the customer/user identity. For example, a particular block may record all transactions related to a particular customer/user occurring between two timestamps. Such implementations may serve to save space and still preserve the authenticity of transactions in each block.

In some embodiments, the blockchains described herein may include smart contracts, which the system 100 may leverage to self-execute and perform various functions (e.g., automated transact across enterprise devices in the system 100). It should be appreciated that a smart contract may be embodied as computer-executable code stored in a blockchain and configured to self-execute by the nodes of the blockchain system based on various conditions/terms defined by the respective smart contract. Accordingly, smart contracts may be stored to a blockchain and executed by the blockchain nodes automatically and without discretion of the nodes, and the smart contract is therefore distributed and immutable. The particular conditions/terms associated with execution of various functions can be anything depending on the particular smart contract and context of the relationships involved. The smart contracts may be executing on each of the nodes in the blockchain network continuously to monitor for the satisfaction of the various conditions described therein, and may involve primitive and/or sophisticated tasks depending on the particular embodiment. In some embodiments, a data sharing scenario may involve a data requestor (e.g., the enterprise that needs some specific customer/user data), a data provider (e.g., the enterprise that "owns" the required data), and a transaction facilitator (e.g., an entity/person that writes smart contracts over a permissioned blockchain or non-permissioned blockchain). It should be appreciated that the system 100 may use the blockchain architectures of FIGS. 6-7 in conjunction with one or more of the techniques described herein.

Figure 8:
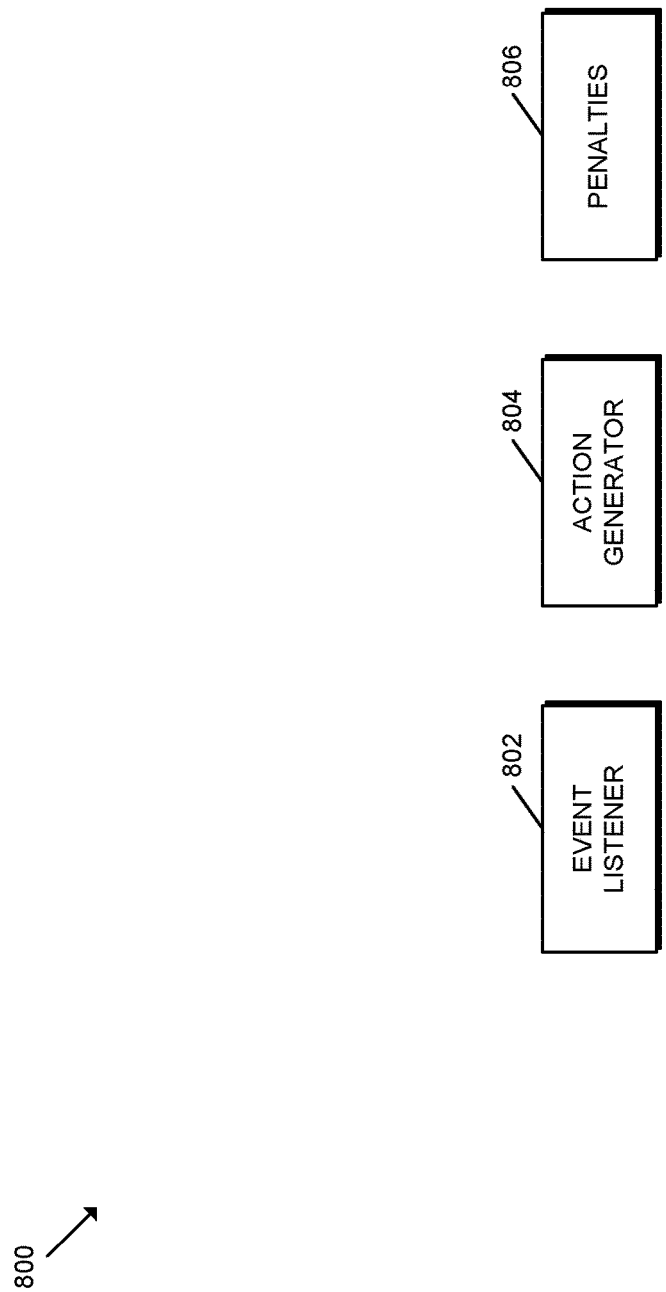
FIG. 8 is a simplified block diagram of at least one embodiment of a smart contract architecture.

Referring now to FIG. 8, a smart contract architecture 800 includes an event listener 802, an action generator 804, and penalties 806. As described above, smart contracts may be added to blockchains in order to automatically monitor various conditions and perform various functions. In some embodiments, a smart contract may be described as self-executing computer-executable code that includes conditions that are monitored and actions performed based on the evaluation of those conditions. In particular, the event listener 802 may listen to the underlying blockchain for one or more particular events to occur and, if so, the action generator 804 causes one or more corresponding actions to execute (e.g., with respect to the blockchain and/or otherwise). In some embodiments, the event listener 802 may determine that one or more penalties 806 should be imposed/enforced in which case penalty code may be automatically executed to enforce the penalties. Although the smart contract architecture 800 includes penalties 806, in some embodiments, a particular smart contract may not include any penalties.

Figure 9:
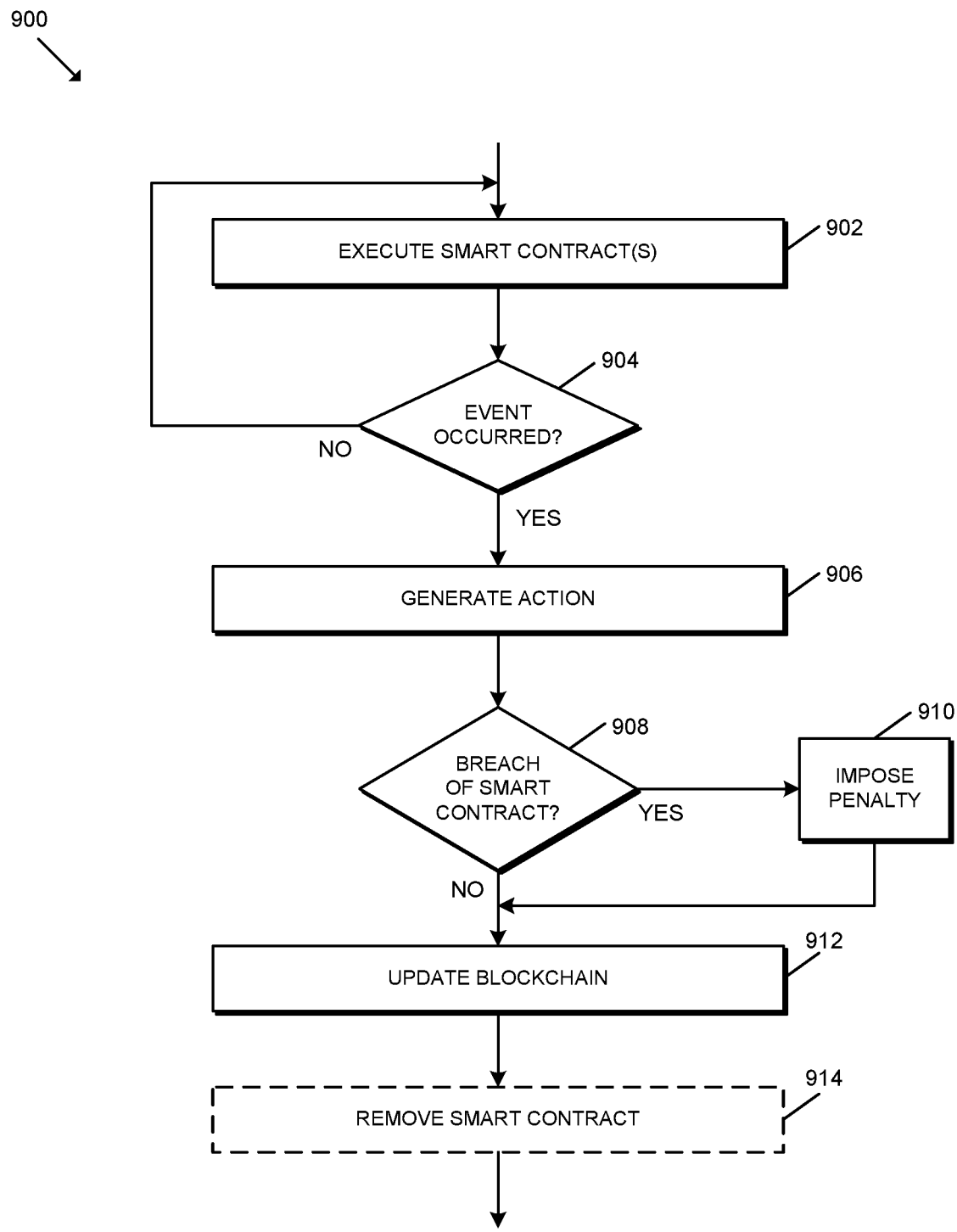
FIG. 9 is a simplified flow diagram of at least one embodiment of a method for conducting a data transaction between enterprises using a smart contract.

Referring now to FIG. 9, in use, the system 100 may execute a method 900 for conducting a data transaction between enterprises using a smart contract. It should be appreciated that the particular blocks of the method 900 are illustrated by way of example, and such blocks may be combined or divided, added or removed, and/or reordered in whole or in part depending on the particular embodiment, unless stated to the contrary.

The method 900 begins with block 902 in which the system 100 or, more specifically, a particular node of the blockchain network executes one or more smart contracts stored on a blockchain. For example, in some embodiments, each of the nodes of the blockchain network may automatically and indiscriminately execute each of the smart contracts to ensure that the terms of the smart contracts are self-executing, distributed, and immutable. As described above, the smart contracts may include one or more events that result in the performance of various actions. Accordingly, if the node determines in block 904 that such an event has occurred, the method 900 advances to block 906 in which the smart contract (or more precisely the node executing the smart contract) executed an action associated with the event occurrence.

As described above, in some embodiments, the smart contracts may identify various penalties associated with the occurrence of a particular event (e.g., breach of the smart contract). Accordingly, if the smart contract (or more precisely the node executing the smart contract) determines in block 908 that breach of the smart contract has occurred (e.g., satisfaction of a condition resulting in penalties), the method 900 advances to block 910 in which one or more penalties are imposed. In block 912, the node (and other nodes also executing the smart contracts) updates the blockchain. In some embodiments, in block 914, one or more conditions may result in the smart contract being removed or disabled from the blockchain (e.g., via self-destruction).

Although the blocks 902-914 are described in a relatively serial manner, it should be appreciated that various blocks of the method 900 may be performed in parallel in some embodiments. For example, in some embodiments, the smart contract monitors for multiple conditions in parallel, including the occurrence of conditions that would constitute breach of the smart contract and/or otherwise impose penalties.

By way of example, suppose a customer, John, updates his address in his last interaction with First Bank. The interaction's insight may reach the blockchain. As such, the event listener of a smart contract may detect the event and from the code, identify the appropriate action to be triggered. For example, the action may be a subsequent interaction with Second Bank where John also holds an account in order to also update his address there. The execution of the smart contract may cause an interaction to be triggered between First Bank and Second Bank to share John's updated address and, once authenticated and approved, Second Bank may gain access to data owned by First Bank (e.g., including or limited to John's updated address) and change the address in its systems as well. As a follow-up, the smart contract may include code to notify John of the successful transaction, and the update may be published to the blockchain.

As another example, John may trigger an interaction with Airline to book a flight for a business trip. As before, the interaction's insight may reach the blockchain, and the event listener may detect the event and trigger and automatic interaction with Airline indicating that John's meal preferences may be obtained from Credit Card Company. Upon approval by Airline, an interaction with Credit Card Company may be automatically triggered to request John's international travel meal preferences. If agreed and validated, Airline may immediately gain access to the meal preferences in Credit Card Company's data regarding John, and it may update its own data. The transaction may be added to the blockchain and, in some embodiments, John may be notified of the successful transaction.

Figure 10:
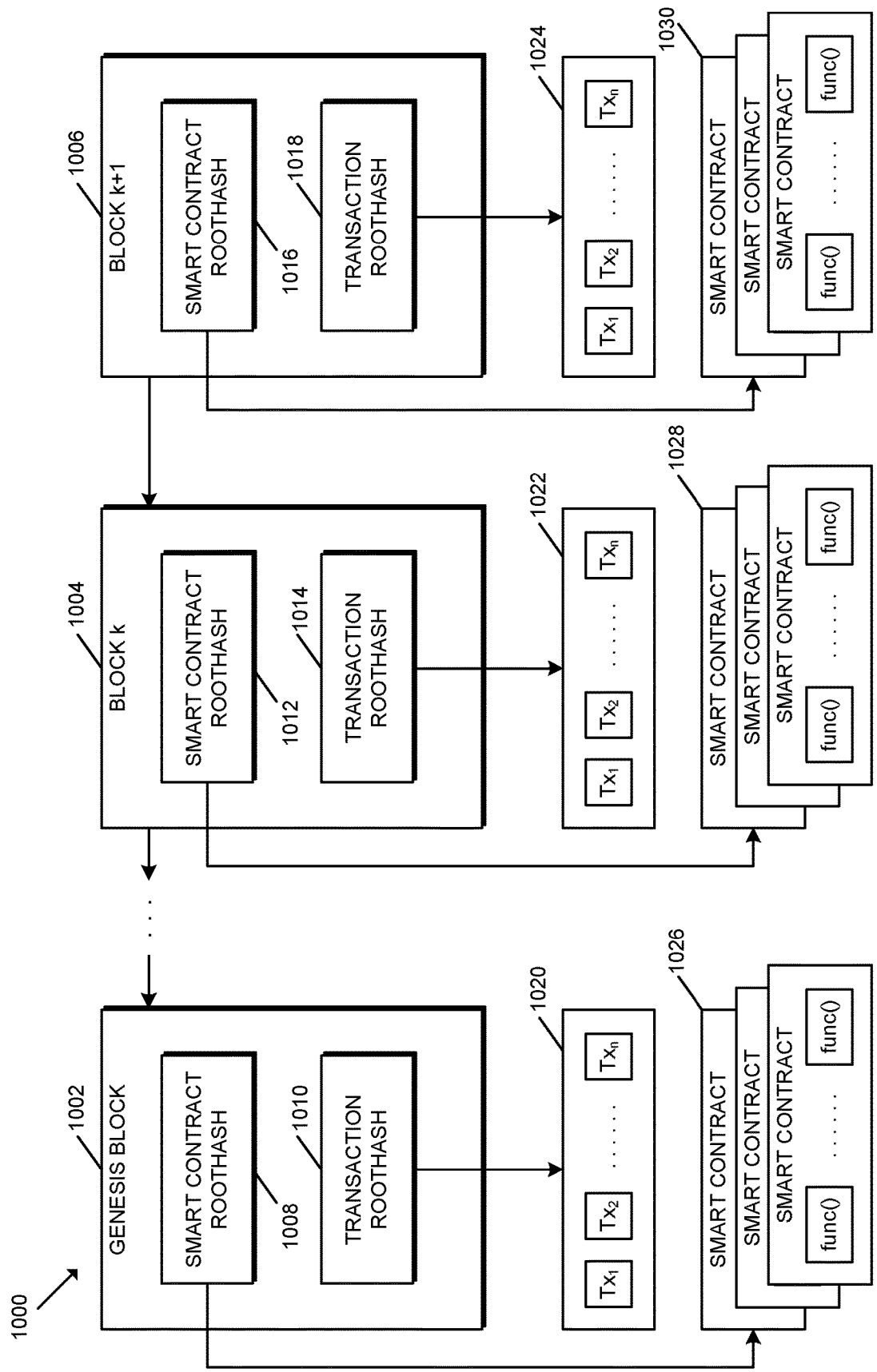
FIG. 10 is a simplified block diagram of at least one embodiment of a blockchain architecture that implements smart contracts.

Referring now to FIG. 10, a blockchain architecture includes a partial blockchain 1000 that implements one or more smart contracts includes a genesis block 1002, a block k 1004, and a block k+1 1004. It should be appreciated that the blocks 1002, 1004, 1006 illustrated in the blockchain 1000 may include only a portion of the full blockchain 1000, such that one or more additional blocks may be included between the genesis block 1002 and the block k 1004 (e.g., represented by the ellipsis). If the blockchain 1000 includes only the three blocks 1002, 1004, 1006, then the genesis block 1002 may also be described as the block k−1.

Each of the blocks in the illustrative blockchain 1000 includes a smart contract roothash and a transaction roothash. For example, the genesis block 1002 includes the smart contract roothash 1008 and the transaction roothash 1010, the block k 1004 includes the smart contract roothash 1012 and the transaction roothash 1014, and the block k+1 1006 includes the smart contract roothash 1016 and the transaction roothash 1018. As with the blockchain 700 of FIG. 7, it should be appreciated that multiple transactions may be stored to a particular block of the blockchain 1000 of FIG. 10. For example, as depicted in FIG. 10, the blockchain 1000 includes transactions 1020 ($T_{X_1}, T_{X_2}, \ldots, T_{X_n}$) included in or otherwise linked to the transaction root 1010 of the genesis block 1002, transactions 1022 ($T_{X_1}, T_{X_2}, \ldots, T_{X_n}$) included in or otherwise linked to the transaction root 1014 of the block 1004 (e.g., with timestamp k), and transactions 1024 ($T_{X_1}, T_{X_2}, \ldots, T_{X_n}$) included in or otherwise linked to the transaction root 1018 of block 1006 (e.g., with timestamp k+1). Further, in some embodiments, one or more smart contracts may be stored to the blocks of the blockchain 1000 and configured to automatically self-execute code and monitor for various conditions (e.g., with respect to interactions with the blockchain 1000) as described above. For example, as depicted in FIG. 10, the blockchain 1000 includes smart contracts 1026 included in or otherwise linked to the smart contract roothash 1008, smart contracts 1028 included in or otherwise linked to the smart contract roothash 1012, and smart contracts 1030 included in or otherwise linked to the smart contract roothash 1016. Although omitted for illustration of other properties of the blockchain 1000, it should be further appreciated that each of the blocks of the blockchain 1000 may also include a hash of the previous block's header (e.g., previous block to be added to the blockchain 1000 chronologically). It should be appreciated that the system 100 may use the blockchain architecture of FIG. 10 in conjunction with one or more of the techniques described herein.

Figure 11:
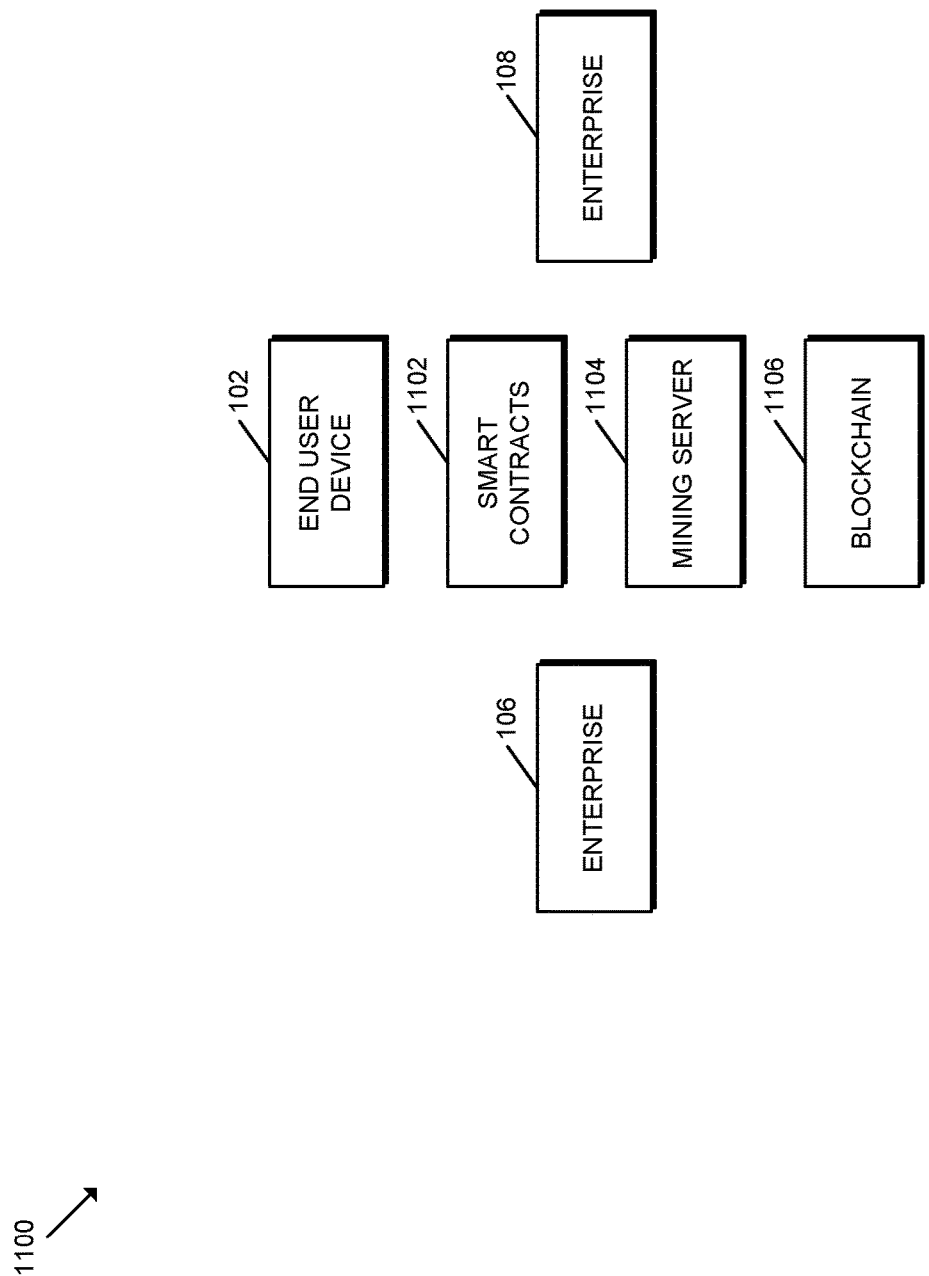
FIG. 11 is a simplified block diagram of at least one embodiment of an architecture for automatically completing data transactions using a permissioned blockchain infrastructure.

Referring now to FIG. 11, an architecture 1100 for automatically completing data transactions using a permissioned blockchain infrastructure includes an end user device 102, smart contracts 1102, a mining server 1104, a blockchain 1106, an enterprise 106, and an enterprise 108. The end user device 102, the enterprise 106, and the enterprise 108 of FIG. 11 are described above in reference to FIG. 1 and, therefore, the descriptions of those components are not repeated herein for brevity of the description. The smart contracts 1102 of FIG. 11 may be embodied as one of and/or otherwise consistent with the description of the smart contracts described in reference to FIGS. 8-10 or a portion thereof. The blockchain 1106 may be embodied as a blockchain having properties consistent with the description of the blockchain described in reference to FIGS. 4-7 and/or otherwise described herein. The mining server 1104 may be embodied as any one or more types of devices/systems capable of mining data and otherwise performing the functions described herein. In some embodiments, the mining server 1104 may be embodied as or include a server that leverages one or more machine learning algorithms to ascertain patterns and/or relevant information related to the underlying data, which may be used to facilitate prediction of events. The smart contracts 1102 may function based on an activity/trigger in the mining server 1104 that may run "on top of" the blockchain 1106. The smart contracts 1102 may execute an action associated with each such activity/trigger, thereby, storing the execution results in the blockchain 1106.

Figure 12:
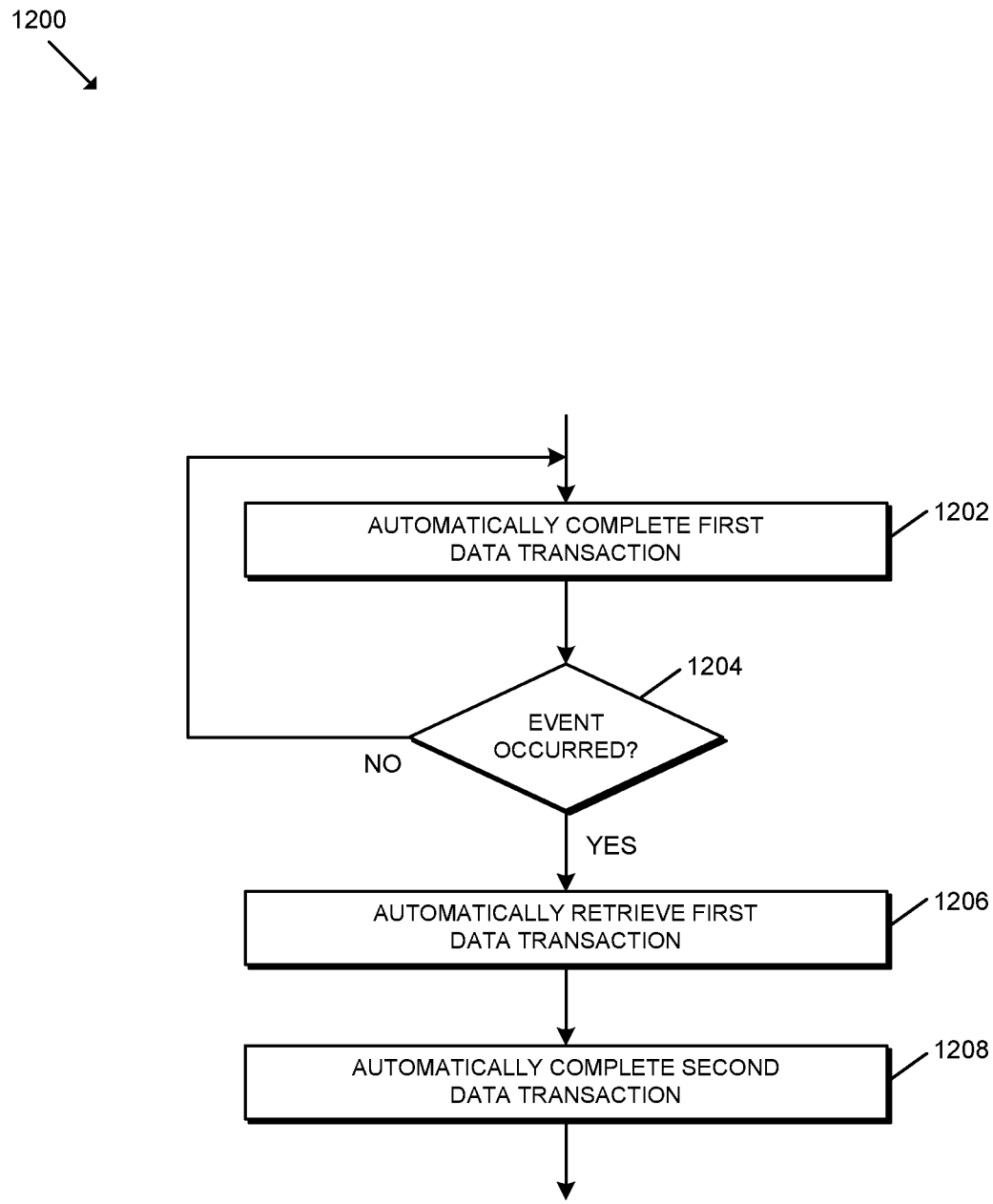
FIG. 12 is a simplified flow diagram of at least one embodiment of a method for automatically completing data transactions using a permissioned blockchain infrastructure.

Referring now to FIG. 12, in use, the system 100 may execute a method 1200 for automatically completing data transactions using a permissioned blockchain infrastructure. It should be appreciated that the particular blocks of the method 1200 are illustrated by way of example, and such blocks may be combined or divided, added or removed, and/or reordered in whole or in part depending on the particular embodiment, unless stated to the contrary. Prior to execution of the method 1200, it should be appreciated that an end user may interact with the end user device 102 via a user interface of the application 120 (e.g., the personal bot system and/or a graphical user interface) in order to communicate a request for data to an enterprise (e.g., the system 100, via the enterprise 106, may receive a request for data). For example, an end user may communicate an intent to book a flight to an airline enterprise (e.g., the enterprise 106) via the application 120 (e.g., the personal bot system).

The illustrative method 1200 may begin with block 1202 in which the system 100 (e.g., via the enterprise 106 or, more specifically, the contact center system 114 of the enterprise 106) may receive the request for data from the end user device 102 (e.g., via the application 120 or, more particularly, the personal bot system). In some embodiments, the request for data may be generated by the end user device 102 utilizing the application 120 (e.g., the personal bot system). In some embodiments, the request for data may be generated by the end user device 102 utilizing at least one of an email, a chat, a website search, a survey feedback, a voice, or a social media conversation. In some embodiments, the end user device 102 may be an IoT device. For example, the IoT readings of an end user's air conditioner may generate an interaction with an enterprise that the end user's air conditioner compressor may have problems and may need service. The system 100 (e.g., via the enterprise 106) may transmit the requested data to the end user device 102 (e.g., via the application 120 or, more particularly, the personal bot system), thereby, completing a first data transaction. For example, the enterprise 106 may complete the booking of a flight with the end user device 102. The system 100 may store the first data transaction on the blockchain of the present disclosure. In some embodiments, in doing so, the system 100 may execute the method 500 of FIG. 5 (or a portion thereof) as described in detail below in association with the method 1200 of FIG. 12.

In block 1204, they system 100 may determine whether an event associated with the first data transaction occurred at another enterprise (e.g., the enterprise 108) by using a mining server to automatically retrieve the first data transaction in response to identifying the event. If the system 100 determines that an event associated with the first data transaction occurred, the method 1200 may advance to block 1206 in which the system 100 may automatically retrieve the first data transaction. However, if the system 100 determines that an event associated with the first data transaction did not occur, the method 1200 may return to block 1202 (or wait until a relevant event has occurred). In block 1208, the system 100 (e.g., the enterprise 108) may automatically complete a second data transaction. For example, an internet commerce retail enterprise (e.g., the enterprise 108) may automatically notify a delivery service that the end user is not home based on the end user's flight booking as retrieved by the mining server in order to automatically reschedule delivery of a retail product). In some embodiments, the system 100 may communicate with the end user device 102 (e.g., via the application 120 or, more particularly, the personal bot system) to assist with completing the second data transaction. For example, the system 100 may determine the GPS location of the end user device 102 by accessing the application 120 (e.g., the personal bot system) of the end user device 102. In some embodiments, the system 100 (e.g., the enterprise 106) may communicate with the oracle system 134 to automatically request data from an off-chain enterprise (e.g., the enterprise 122) to complete the second data transaction. For example, the system 100 may locate a taxi cab's position by accessing the internal RFID tag of the taxi cab or the system 100 may review the weather in a particular location to determine the waiting time for an end user that booked a cab via a mobile application).

Although the blocks 1202-1208 are described in a relatively serial manner, it should be appreciated that various blocks of the method 1200 may be performed in parallel in some embodiments. After execution of the method 1200, it should be appreciated that the system 100 may store the second data transaction on the blockchain of the present disclosure. In some embodiments, in doing so, the system 100 may execute the method 500 of FIG. 5 (or a portion thereof) as described in detail below in association with the method 1200 of FIG. 12.

What is claimed is:

1. A method for conducting a data transaction between an on-chain enterprise internal to a blockchain network and an off-chain enterprise external to the blockchain network using a permissioned blockchain infrastructure and an oracle system, the method comprising:
   receiving, at a first enterprise internal to the blockchain network, a request for data from an end user;
   determining whether the on-chain enterprise or the off-chain enterprise possesses the requested data;
   transmitting, by the first enterprise, the request for data to the oracle system in response to determining that the off-chain enterprise possesses the requested data, wherein the oracle system comprises an inbound automated oracle and an outbound automated oracle;
   transmitting, by the oracle system, the request for data to the off-chain enterprise via the outbound automated oracle;
   providing, by the off-chain enterprise, the requested data to the oracle system to permit the data transaction between the first enterprise and the oracle system using the permissioned blockchain infrastructure;
   providing the requested data to the first enterprise by (i) generating a block representing the data transaction in the permissioned blockchain infrastructure, (ii) publishing the block to one or more nodes in the permissioned blockchain infrastructure, (iii) validating the data transaction at the one or more nodes in the permissioned blockchain infrastructure, (iv) adding the block to a blockchain based on a consensus reached among the one or more nodes in the permissioned blockchain infrastructure, (v) updating the one or more nodes in the permissioned blockchain infrastructure with the block, and (vi) labeling the data transaction as successful; and
   transmitting the requested data to the end user after the providing the requested data to the first enterprise.

2. The method of claim 1, wherein providing the requested data to the first enterprise comprises using the oracle system as a bridge between the first enterprise and the off-chain enterprise.

3. The method of claim 1, wherein the oracle system comprises at least one of a single sourced oracle and a multiple sourced oracle.

4. The method of claim 1, further comprising a technical framework to reduce the risk of the oracle system tampering with the requested data, wherein the technical framework comprises at least one of a digital notary or a secure hardware bridge.

5. The method of claim 1, wherein the block includes self-executing computer-executable code configured to monitor one or more conditions associated with the blockchain.

6. One or more non-transitory machine-readable storage media comprising a plurality of instructions stored thereon that, in response to execution by at least one processor, causes the at least one processor to execute a method for conducting a data transaction between an on-chain enterprise internal to a blockchain network and an off-chain enterprise external to the blockchain network using a permissioned blockchain infrastructure and an oracle system, the method comprising:

receiving, at a first enterprise internal to the blockchain network, a request for data from an end user;

determining whether the on-chain enterprise or the off-chain enterprise possesses the requested data;

transmitting, by the first enterprise, the request for data to the oracle system in response to determining that the off-chain enterprise possesses the requested data, wherein the oracle system comprises an inbound automated oracle and an outbound automated oracle;

transmitting, by the oracle system, the request for data to the off-chain enterprise via the outbound automated oracle;

providing, by the off-chain enterprise, the requested data to the oracle system to permit the data transaction between the first enterprise and the oracle system using the permissioned blockchain infrastructure;

providing the requested data to the first enterprise by (i) generating a block representing the data transaction in the permissioned blockchain infrastructure, (ii) publishing the block to one or more nodes in the permissioned blockchain infrastructure, (iii) validating the data transaction at the one or more nodes in the permissioned blockchain infrastructure, (iv) adding the block to a blockchain based on a consensus reached among the one or more nodes in the permissioned blockchain infrastructure, (v) updating the one or more nodes in the permissioned blockchain infrastructure with the block, and (vi) labeling the data transaction as successful; and transmitting the requested data to the end user after the providing the requested data to the first enterprise.

7. A method for automatically completing blockchain data transactions using a permissioned blockchain infrastructure, the method comprising:

receiving at a first enterprise a request for first data from an end user;

providing, by the first enterprise, the requested first data to the end user thereby completing a first blockchain data transaction;

storing the first blockchain data transaction on a blockchain by (i) generating a block representing the first blockchain data transaction in the permissioned blockchain infrastructure, (ii) publishing the block to one or more nodes in the permissioned blockchain infrastructure, (iii) validating the first blockchain data transaction at the one or more nodes in the permissioned blockchain infrastructure, (iv) adding the block to the blockchain based on a consensus reached among the one or more nodes in the permissioned blockchain infrastructure, (v) updating the one or more nodes in permissioned the blockchain infrastructure with the block, and (vi) labeling the first blockchain data transaction as successful;

determining that an event associated with the first blockchain data transaction occurred at a second enterprise by using a mining server to retrieve the first blockchain data transaction in response to identifying the event, wherein the second enterprise communicates with an oracle system to complete a second blockchain data transaction, wherein the oracle system comprises an inbound automated oracle and an outbound automated oracle; and completing, by the second enterprise, a the second blockchain data transaction based on the first blockchain data transaction.

8. The method of claim 7, further comprising storing the second blockchain data transaction on the blockchain by (i) generating a second block representing the second blockchain data transaction in the blockchain infrastructure, (ii) publishing the second block to the one or more nodes in the blockchain infrastructure, (iii) validating the second blockchain data transaction at the one or more nodes in the blockchain infrastructure, (iv) adding the second block to the blockchain based on a second consensus reached among the one or more nodes in the blockchain infrastructure, (v) updating the one or more nodes in the blockchain infrastructure with the second block, and (vi) labeling the second blockchain data transaction as successful.

9. The method of claim 7, wherein the second enterprise communicates with a personal bot system to complete the second blockchain data transaction.

10. The method of claim 7, wherein the block includes self-executing computer-executable code configured to monitor one or more conditions associated with the blockchain.

11. A system for conducting a data transaction between an on-chain enterprise internal to a blockchain network and an off-chain enterprise external to the blockchain network using a permissioned blockchain infrastructure and an oracle system, the system comprising:

at least one processor; and at least one memory comprising a plurality of instructions stored thereon that, in response to execution by the at least one processor, causes the system to:

receive, at a first enterprise internal to the blockchain network, a request for data from an end user;

determine whether the on-chain enterprise or the off-chain enterprise possesses the requested data;

transmit, by the first enterprise, the request for data to the oracle system in response to a determination that the off-chain enterprise possesses the requested data, wherein the oracle system comprises an inbound automated oracle and an outbound automated oracle;

transmit, by the oracle system, the request for data to the off-chain enterprise via the outbound automated oracle;

provide, by the off-chain enterprise, the requested data to the oracle system to permit the data transaction between the first enterprise and the oracle system using the permissioned blockchain infrastructure;

provide the requested data to the first enterprise by (i) generating a block representing the data transaction in the permissioned blockchain infrastructure, (ii) publishing the block to one or more nodes in the permissioned blockchain infrastructure, (iii) validating the data transaction at the one or more nodes in the permissioned blockchain infrastructure, (iv) adding the block to a blockchain based on a consensus reached among the one or more nodes in the permissioned blockchain infrastructure, (v) updating the one or more nodes in the permissioned blockchain infrastructure with the block, and (vi) labeling the data transaction as successful; and transmit the requested data to the end user after the requested data is provided to the first enterprise.

12. The system of claim 11, wherein providing the requested data to the first enterprise comprises using the oracle system as a bridge between the first enterprise and the off-chain enterprise.

13. The system of claim 11, wherein the oracle system comprises at least one of a single sourced oracle and a multiple sourced oracle.

14. The system of claim 11, further comprising a technical framework to reduce the risk of the oracle system tampering with the requested data.

15. The system of claim 14, wherein the technical framework comprises at least one of a digital notary, a secure hardware bridge, and an additional oracle system.

16. The system of claim 11, wherein the block includes self-executing computer-executable code configured to monitor one or more conditions associated with the blockchain.

17. The system of claim 11,
wherein to transmit the request for data to the oracle system comprises to transmit the request for data to the outbound automated oracle;
wherein to provide the requested data to the oracle system comprises to provide the requested data to the inbound automated oracle; and
wherein to provide the requested data to the first enterprise comprises to provide the requested data to the first enterprise via the inbound automated oracle.

* * * * *

UNITED STATES PATENT AND TRADEMARK OFFICE
CERTIFICATE OF CORRECTION

| | | |
|---|---|---|
| PATENT NO. | : 11,637,701 B2 | Page 1 of 1 |
| APPLICATION NO. | : 17/029834 | |
| DATED | : April 25, 2023 | |
| INVENTOR(S) | : Archana Sekar et al. | |

It is certified that error appears in the above-identified patent and that said Letters Patent is hereby corrected as shown below:

In the Claims

In Claim 7, Column 32, Lines 1-2, replace --a the second blockchain data transaction-- with --the second blockchain data transaction--.

Signed and Sealed this
Fifteenth Day of August, 2023

Katherine Kelly Vidal
*Director of the United States Patent and Trademark Office*